(12) United States Patent
Campos

(10) Patent No.: US 11,683,097 B2
(45) Date of Patent: *Jun. 20, 2023

(54) NETWORK COMMUNICATIONS SYSTEMS AND METHODS

(71) Applicant: CABLE TELEVISION LABORATORIES, INC., Louisville, CO (US)

(72) Inventor: Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,671

(22) Filed: Dec. 27, 2021

(65) Prior Publication Data
US 2022/0123839 A1 Apr. 21, 2022

Related U.S. Application Data

(63) Continuation of application No. 16/827,792, filed on Mar. 24, 2020, now Pat. No. 11,212,006, which is a
(Continued)

(51) Int. Cl.
*H04J 14/00* (2006.01)
*H04B 10/50* (2013.01)
(Continued)

(52) U.S. Cl.
CPC ......... *H04B 10/504* (2013.01); *H04B 10/502* (2013.01); *H04B 10/505* (2013.01); *H04B 10/506* (2013.01); *H04B 10/532* (2013.01); *H04B 10/63* (2013.01); *H04B 10/64* (2013.01); *H04J 14/04* (2013.01); *H04J 14/06* (2013.01)

(58) Field of Classification Search
CPC .. H04B 10/504; H04B 10/502; H04B 10/505; H04B 10/506; H04B 10/532; H04B 10/63; H04B 10/64; H04B 10/40; H04B 10/27; H04B 10/0795; H04B 10/2587; H04B 10/5161; H04B 10/6161; H04B 10/541; H04J 14/02; H04J 14/06; H04J 14/04;
(Continued)

(56) References Cited

U.S. PATENT DOCUMENTS 10,601,513 B2 * 3/2020 Campos ............... H04B 10/532
11,212,006 B2 * 12/2021 Campos ............... H04B 10/63
(Continued)

*Primary Examiner* — Hanh Phan
(74) *Attorney, Agent, or Firm* — Josh Snider

(57) ABSTRACT

Methods, systems, and devices for network communications to reduce optical beat interference (OBI) in upstream communications are described. For example, a fiber node may provide a seed source to injection lock upstream laser diodes. Therefore, upstream communications from each injection locked laser diode may primarily include the wavelength associated with each seed source. The seed sources may be unique to each end device and configured to minimize OBI. That is, the upstream laser diodes may be generic, but the collected seed source may enable upstream communications at varying wavelengths. The end device may provide upstream communications by externally modulating a signal generated by the injection locked laser diode.

20 Claims, 22 Drawing Sheets

Related U.S. Application Data continuation of application No. 16/265,777, filed on Feb. 1, 2019, now Pat. No. 10,601,513, which is a continuation-in-part of application No. 15/861,303, filed on Jan. 3, 2018, now Pat. No. 10,447,404, which is a continuation of application No. 15/283,632, filed on Oct. 3, 2016, now Pat. No. 9,912,409.

(60) Provisional application No. 62/625,096, filed on Feb. 1, 2018, provisional application No. 62/321,211, filed on Apr. 12, 2016.

(51) Int. Cl.
    *H04B 10/63*     (2013.01)
    *H04B 10/532*     (2013.01)
    *H04B 10/64*     (2013.01)
    *H04J 14/06*     (2006.01)
    *H04J 14/04*     (2006.01)

(58) Field of Classification Search
CPC .............. H04J 14/0282; H04J 14/0247; H04J 14/0249; H04J 14/0246
USPC ........ 398/66, 67, 68, 69, 70, 71, 72, 79, 82, 398/100, 135, 136, 158, 159, 183, 188, 398/202, 204, 205, 207, 208, 209, 152, 398/65
See application file for complete search history.

(56) References Cited

U.S. PATENT DOCUMENTS

| | | | |
|---|---|---|---|
| 2010/0215368 A1* | 8/2010 | Qian | H04J 14/0247 398/67 |
| 2011/0091214 A1* | 4/2011 | Cheng | H04B 10/506 398/91 |
| 2015/0030334 A1* | 1/2015 | Eiselt | H04J 14/0282 398/79 |

* cited by examiner

NETWORK COMMUNICATIONS SYSTEMS AND METHODS

CROSS REFERENCES TO RELATED APPLICATIONS

This application is a continuation of U.S. patent application Ser. No. 16/827,792, filed Mar. 24, 2020, which is a continuation of U.S. patent application Ser. No. 16/265,777, filed Feb. 1, 2019, which application claims the benefit of and priority to U.S. patent application Ser. No. 15/861,303 filed Jan. 3, 2018, which claims benefit of and priority to U.S. patent application Ser. No. 15/283,632 filed Oct. 3, 2016, which claims the benefit of and priority to U.S. Provisional Patent Application Ser. No. 62/321,211, filed Apr. 12, 2016, each of which are incorporated herein by reference in their entireties, and additionally claims the benefit of and priority to U.S. Provisional Patent Application Ser. No. 62/625,096, filed Feb. 1, 2018, all of which are incorporated herein by reference in their entirety.

BACKGROUND

The field of the disclosure relates generally to fiber communication networks, and more particularly, to optical networks utilizing simultaneous upstream communications.

Telecommunication networks include an access network through which end device subscribers connect to a service provider. Bandwidth requirements for delivering high-speed data and video services through the access network are rapidly increasing to meet growing consumer demands. At present, data delivery over the access network is growing by gigabits (Gb)/second for residential subscribers, and by multi-Gb/s for business subscribers. Present access networks are based on passive optical network (PON) access technologies, which have become the dominant system architecture to meet the growing high capacity demand from end devices.

Gigabit PON and Ethernet PON (EPON) architectures presently provide about 2.5 Gb/s data rates for downstream transmission and 1.25 Gb/s for upstream transmission (half of the downstream rate). 10 Gb/s PONs (XG-PON or IEEE 10G-EPON) have begun to be implemented for high-bandwidth applications, and a 40 Gb/s PON scheme, which is based on time and wavelength division multiplexing (TWDM and WDM) has recently been standardized. A growing need therefore exists to develop higher/faster data rates per-subscriber to meet future bandwidth demand, and also increase the coverage for services and applications, but while also minimizing the capital and operational expenditures necessary to deliver higher capacity and performance access networks.

One known solution to increase the capacity of a PON is the use of WDM technology to send a dedicated wavelength signal to end devices. Current detection scheme WDM technology, however, is limited by its low receiver sensitivity when coherent signals are employed, and also by the few options available to upgrade and scale the technology, particularly with regard to use in conjunction with the lower-quality legacy fiber environment. The legacy fiber environment requires operators to squeeze more capacity out of the existing fiber infrastructure to avoid costs associated with having to retrench new fiber installment. Conventional cable access networks typically include six fibers per node, servicing as many as 500 end devices, such as home subscribers. Conventional nodes cannot be split further without adding fiber and do not typically contain spare (unused) fibers, and thus there is a need to utilize the limited fiber availability in a more efficient and cost-effective manner.

Coherent technology has been proposed as one solution to increase both receiver sensitivity and overall capacity for WDM-PON optical access networks, in both brown and green field deployments. Coherent technology offers superior receiver sensitivity and extended power budget, and high frequency selectivity that provides closely-spaced dense or ultra-dense WDM without the need for narrow band optical filters. Moreover, a multi-dimensional recovered signal experienced by coherent technology provides additional benefits to compensate for linear transmission impairments such as chromatic dispersion (CD) and polarization-mode dispersion (PMD), and to efficiently utilize spectral resources to benefit future network upgrades through the use of multi-level advanced modulation formats. Long distance transmission using coherent technology, however, requires elaborate post-processing, including signal equalizations and carrier recovery, to adjust for impairments experienced along the transmission pathway, thereby presenting significant challenges by significantly increasing system complexity.

Coherent technology in long-haul optical systems typically requires significant use of high quality discrete photonic and electronic components, such as digital-to-analog converters (DAC), analog to digital converters (ADC), and digital signal processing (DSP) circuitry such as an application-specific integrated circuit (ASIC) utilizing complimentary metal-oxide semiconductor (CMOS) technology, to compensate for noise, frequency drift, and other factors affecting the transmitted channel signals over the long distance optical transmission. Coherent pluggable modules for metro solution have gone through C Form-factor pluggable (CFP) to CFP2 and future CFP4 via multi-source agreement (MSA) standardization to reduce their footprint, to lower costs, and also to lower power dissipation. However, these modules still require significant engineering complexity, expense, size, and power to operate, and therefore have not been practical to implement in access applications.

There could be many services that coexist in cable's optical access networks such as the traditional subcarrier multiplexed analog video, digital video and DOCSIS data services along with the less common radio frequency over glass (RFOG), EPON, Point-to-Point digital fiber links and others. When these are aggregated together, or even worse when they are aggregated over fiber with RFOG and analog, optical beat interference (OBI) becomes a significant problem. There is a need for a system that provides services that coexist in cable's optical access networks, meets a bandwidth demand, and decreases problems associated with OBI.

SUMMARY

Simultaneous transmissions and transmissions from different services may result in optical beat interference (OBI). For example, if two devices transmit using wavelengths close enough to one another in frequency such that the difference falls within the frequency response of the optical receiver, the transmissions may cause OBI. The system may ensure that upstream transmissions are maintained according to certain wavelength windows in order to decrease OBI. For example, a fiber node may provide more than one seed source (e.g., a narrow wavelength band) and transmit each seed source to an end device. The seed sources may be maintained within constraints of wavelength filter windows such that the wavelength bands of each of the seed sources minimize OBI between signals corresponding to the wavelength bands. The end devices may use injection locking of upstream laser diodes to generate upstream communications according to the collected wavelength band, thus minimizing OBI resulting in simultaneous upstream communications from the devices. The end devices may further use external modulation of the laser diodes to encode the signals generated by the laser diodes for upstream communications.

A method of network communications is described. The method may include an optical circulator configured to collect a seed source spanning a wavelength range and direct the seed source to a laser diode, the laser diode configured to output a signal including primarily the wavelength range based on the collecting the seed source at the laser diode, and an external modulator configured to modulate the signal output by the laser diode, where the optical circulator is further configured to collect the modulated signal and direct the modulated signal upstream.

An apparatus for network communications is described. The apparatus may include a processor, memory in electronic communication with the processor, and instructions stored in the memory. The instructions may be executable by the processor to cause the apparatus to an optical circulator configured to collect a seed source spanning a wavelength range and direct the seed source to a laser diode, the laser diode configured to output a signal including primarily the wavelength range based on the collecting the seed source at the laser diode, and an external modulator configured to modulate the signal output by the laser diode, where the optical circulator is further configured to collect the modulated signal and direct the modulated signal upstream.

Another apparatus for network communications is described. The apparatus may include means for an optical circulator configured to collect a seed source spanning a wavelength range and direct the seed source to a laser diode, the laser diode configured to output a signal including primarily the wavelength range based on the collecting the seed source at the laser diode, and an external modulator configured to modulate the signal output by the laser diode, where the optical circulator is further configured to collect the modulated signal and direct the modulated signal upstream.

A non-transitory computer-readable medium storing code for network communications is described. The code may include instructions executable by a processor to an optical circulator configured to collect a seed source spanning a wavelength range and direct the seed source to a laser diode, the laser diode configured to output a signal including primarily the wavelength range based on the collecting the seed source at the laser diode, and an external modulator configured to modulate the signal output by the laser diode, where the optical circulator is further configured to collect the modulated signal and direct the modulated signal upstream.

In some examples of the method, apparatuses, and non-transitory computer-readable medium described herein, a filter configured to, separate the seed source and the downstream signal, and direct the seed source to the optical circulator and the downstream signal to a photodetector.

Some examples of the method, apparatuses, and non-transitory computer-readable medium described herein may further include operations, features, means, or instructions for outputting the signal including primarily the wavelength range may be based on injection locking the laser diode using the seed source.

In some examples of the method, apparatuses, and non-transitory computer-readable medium described herein, a second optical circulator disposed between the laser diode and the external modulator.

In some examples of the method, apparatuses, and non-transitory computer-readable medium described herein, the second optical circulator may be in one-way communication with the external modulator and in two-way communication with the laser diode.

In some examples of the method, apparatuses, and non-transitory computer-readable medium described herein, the laser diode further may include operations, features, means, or instructions for a front facet and the laser diode may be further configured to collect the seed source at the front facet of the laser diode.

In some examples of the method, apparatuses, and non-transitory computer-readable medium described herein, a second optical circulator disposed between and in one-way communication with the optical circulator and the laser diode.

In some examples of the method, apparatuses, and non-transitory computer-readable medium described herein, the laser diode further may include operations, features, means, or instructions for a rear facet and the laser diode may be configured to collect the seed source by the rear facet of the laser diode.

In some examples of the method, apparatuses, and non-transitory computer-readable medium described herein, a photodetector in one-way communication with the second optical circulator and configured to collect a portion of the seed source reflected from the rear facet of the laser diode to the photodetector, by the second optical circulator.

A method of network communications is described. The method may include an optical circulator configured to collect a combined signal including a downstream signal and a seed source spanning a wavelength range, a filter configured to collect the combined signal from the optical circulator and separate the downstream signal and the seed source, a laser diode configured to collect the seed source and output a signal including primarily the wavelength range based on collecting the seed source at the laser diode, and an external modulator configured to modulate the laser diode signal output, where the optical circulator is further configured to collect the modulated signal from the external modulator and direct the modulated signal upstream.

An apparatus for network communications is described. The apparatus may include a processor, memory in electronic communication with the processor, and instructions stored in the memory. The instructions may be executable by the processor to cause the apparatus to an optical circulator configured to collect a combined signal including a downstream signal and a seed source spanning a wavelength range, a filter configured to collect the combined signal from the optical circulator and separate the downstream signal and the seed source, a laser diode configured to collect the seed source and output a signal including primarily the wavelength range based on collecting the seed source at the laser diode, and an external modulator configured to modulate the laser diode signal output, where the optical circulator is further configured to collect the modulated signal from the external modulator and direct the modulated signal upstream.

Another apparatus for network communications is described. The apparatus may include means for an optical circulator configured to collect a combined signal including a downstream signal and a seed source spanning a wavelength range, a filter configured to collect the combined signal from the optical circulator and separate the downstream signal and the seed source, a laser diode configured to collect the seed source and output a signal including primarily the wavelength range based on collecting the seed source at the laser diode, and an external modulator configured to modulate the laser diode signal output, where the optical circulator is further configured to collect the modulated signal from the external modulator and direct the modulated signal upstream.

A non-transitory computer-readable medium storing code for network communications is described. The code may include instructions executable by a processor to an optical circulator configured to collect a combined signal including a downstream signal and a seed source spanning a wavelength range, a filter configured to collect the combined signal from the optical circulator and separate the downstream signal and the seed source, a laser diode configured to collect the seed source and output a signal including primarily the wavelength range based on collecting the seed source at the laser diode, and an external modulator configured to modulate the laser diode signal output, where the optical circulator is further configured to collect the modulated signal from the external modulator and direct the modulated signal upstream.

In some examples of the method, apparatuses, and non-transitory computer-readable medium described herein, a second optical circulator disposed between the laser diode and the external modulator and configured to collect the seed source from the filter, where the second optical circulator may be in one-way communication with the filter and the external modulator and in two-way communication with the laser diode.

In some examples of the method, apparatuses, and non-transitory computer-readable medium described herein, a second external modulator disposed between the optical circulator and the second optical circulator, where the second external modulator may be configured to collect the laser diode signal output from the second optical circulator and further configured to direct a second externally modulated signal to the optical circulator, and a phase shift element disposed between the external modulator and the second optical circulator.

In some examples of the method, apparatuses, and non-transitory computer-readable medium described herein, the seed source may be a coherent signal.

In some examples of the method, apparatuses, and non-transitory computer-readable medium described herein, a polarization beam splitter disposed between the second optical circulator and the phase shift element.

In some examples of the method, apparatuses, and non-transitory computer-readable medium described herein, a third external modulator disposed between the polarization beam splitter and the optical circulator, where the third external modulator may be configured to input a polarized signal from the polarization beam splitter, a fourth external modulator, and a second phase shift element disposed between the polarization beam splitter and the fourth external modulator, where the fourth external modulator may be configured to input the phase shifted signal from the second phase shift element.

In some examples of the method, apparatuses, and non-transitory computer-readable medium described herein, a polarization combiner disposed between the optical circulator and the external modulator.

In some examples of the method, apparatuses, and non-transitory computer-readable medium described herein, the external modulator may be configured to use coherent modulation such that the modulated signal includes more than one data stream.

In some examples of the method, apparatuses, and non-transitory computer-readable medium described herein, the external modulator further includes an in-phase quadrature modulator.

In some examples of the method, apparatuses, and non-transitory computer-readable medium described herein, the laser diode may be configured to collect any seed source of a set of seed sources each spanning a unique wavelength range.

In some examples of the method, apparatuses, and non-transitory computer-readable medium described herein, the filter may be further configured to direct the downstream signal to a photodetector.

A method of network communications is described. The method may include collecting, at an optical circulator, a seed source spanning a wavelength range, generating a signal including primarily the wavelength range based on collecting the seed source, externally modulating the signal including primarily the wavelength range, and outputting, by the optical circulator, the modulated signal.

An apparatus for network communications is described. The apparatus may include a processor, memory in electronic communication with the processor, and instructions stored in the memory. The instructions may be executable by the processor to cause the apparatus to collect, at an optical circulator, a seed source spanning a wavelength range, generate a signal including primarily the wavelength range based on collecting the seed source, externally modulate the signal including primarily the wavelength range, and output, by the optical circulator, the modulated signal.

Another apparatus for network communications is described. The apparatus may include means for collecting, at an optical circulator, a seed source spanning a wavelength range, generating a signal including primarily the wavelength range based on collecting the seed source, externally modulating the signal including primarily the wavelength range, and outputting, by the optical circulator, the modulated signal.

A non-transitory computer-readable medium storing code for network communications is described. The code may include instructions executable by a processor to collect, at an optical circulator, a seed source spanning a wavelength range, generate a signal including primarily the wavelength range based on collecting the seed source, externally modulate the signal including primarily the wavelength range, and output, by the optical circulator, the modulated signal.

Some examples of the method, apparatuses, and non-transitory computer-readable medium described herein may further include operations, features, means, or instructions for generating the signal further includes injection locking the laser diode using the seed source.

In some examples of the method, apparatuses, and non-transitory computer-readable medium described herein, generating the signal further may include operations, features, means, or instructions for driving the laser diode at a constant current.

Some examples of the method, apparatuses, and non-transitory computer-readable medium described herein may further include operations, features, means, or instructions for externally modulating the signal includes modulating the signal based on one or more data streams.

DETAILED DESCRIPTION

Figure 1:
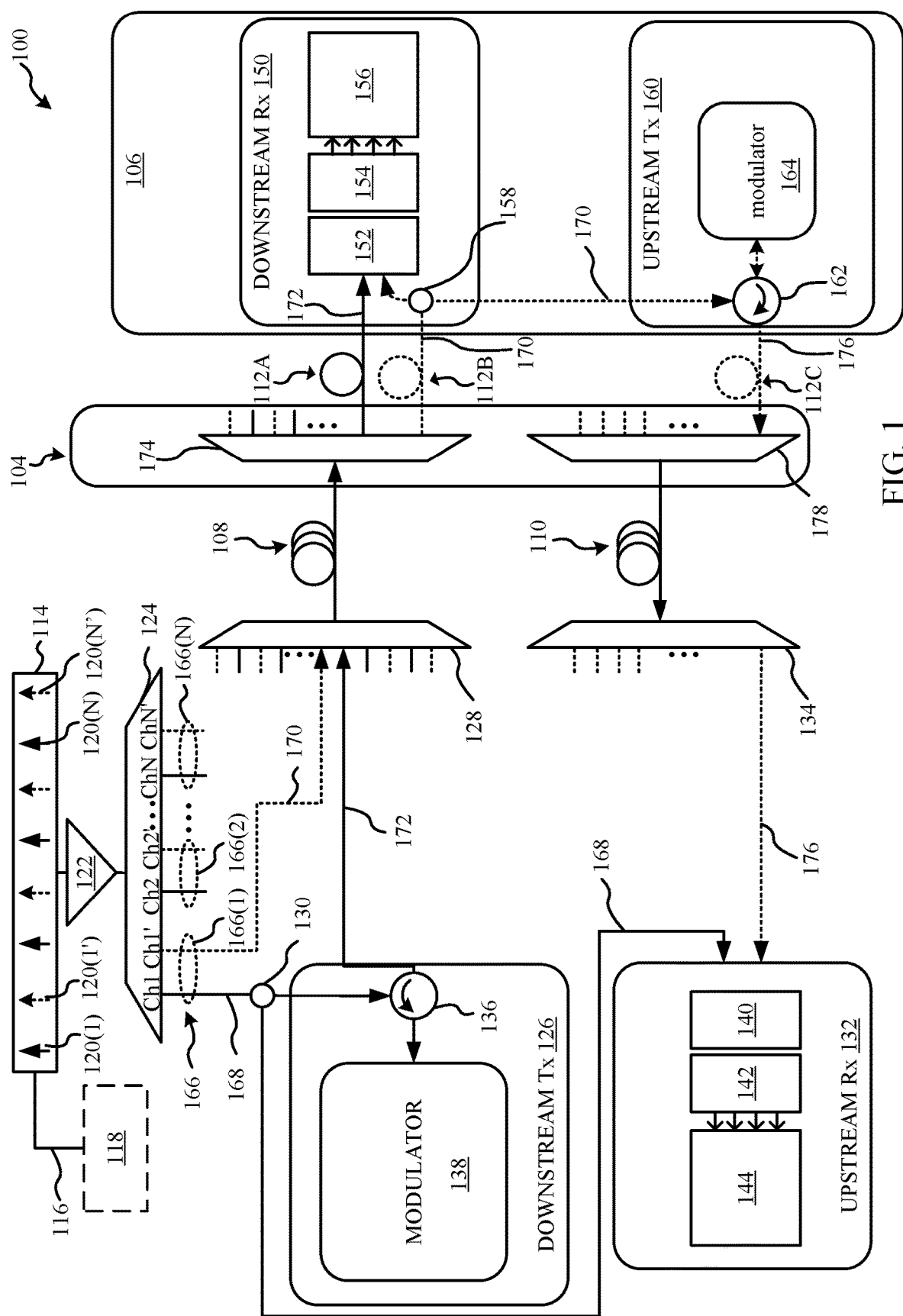
FIG. 1 is a schematic illustration of a fiber communication system in accordance with an embodiment of the present disclosure.

An architecture to minimize optical beat interference (OBI) is described. The architecture may enable multiple transmissions (e.g., upstream transmissions from one or more end devices) at the same time. For example, a system may be a radio frequency over glass (RFOG) system. Certain types of RFOG systems (e.g., RFOG systems carrying data over cable service interface specification (DOCSIS) 3.1 and earlier versions) may include multiple DOCSIS media access control (MAC) layer domains within an optical mode serving area (e.g., an area served by the system), which may enable simultaneous upstream transmissions. Here, multiple simultaneous transmissions may be allowed in synchronous code division multiple access (S-CDMA) mode on the same channel and also in DOCSIS 3.0 and earlier modes across multiple channels. That is, there may be a first transmission on a first channel at the same time that another device transmits on other channels. In DOCSIS 3.1 there may also be multiple simultaneous transmission that are scheduled within the same upstream channel.

Additionally, or alternatively, the system may enable transmissions corresponding to different services (e.g., RFOG, ethernet passive optical network (EPON), etc.). Even though EPON does not utilize simultaneous transmissions, coexistence issues when deployed along with other technologies may arise. The approach proposed here may enable EPON systems and other systems coexist in the same optical network.

Simultaneous transmissions and transmissions from different services may result in OBI. For example, if two devices transmit using wavelengths close enough in frequency such that their difference falls within the frequency response of the optical receiver, their transmissions may cause OBI. The system may ensure that upstream transmissions are maintained according to certain wavelength windows. For example, a fiber node may provide more than one narrow wavelength band (e.g., a seed source) and transmit each seed source to an end device. The seed sources may be maintained within constraints of wavelength filter windows such that the wavelength bands of each of the seed sources minimize OBI between signals corresponding to the wavelength bands. The end devices may use injection locking of upstream laser diodes to generate upstream communications according to the collected wavelength band, thus minimizing OBI resulting in simultaneous upstream communications from the devices. The end devices may alternatively use injection locking of a reflective semiconductor optical amplifier (RSOA) or alternatively use a semiconductors optical amplifier.

The system may multiplex and aggregate services over fiber access networks of cable and other. The approach allows to dedicate a wavelength per end-device without causing OBI regardless of the combination of services desired. The dedicated wavelengths can include intensity modulated optical links, coherent optical links, or a combination of both. The end devices may support dense wavelength division multiplexing (DWDM), but may not use wavelength specific structures.

A number of terms may be referenced herein and may be interpreted as set forth below.

The singular forms "a," "an," and "the" include plural references unless the context clearly dictates otherwise.

"Optional" or "optionally" may indicate that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Aspects of the disclosure are initially described in the context of fiber communications systems. Aspects of the disclosure are further illustrated by and described with reference to process flows, block diagrams, and flowcharts that relate to network communications systems and methods.

FIG. 1 is a schematic illustration of a fiber communication system 100 in accordance with an embodiment of the present disclosure. System 100 includes an optical hub 102, a fiber node 104, and an end device 106. Optical hub 102 is, for example, a central office, a communications hub, or an optical line terminal (OLT). In the embodiment shown, fiber node 104 is illustrated for use with a passive optical network (PON). End device 106 is a downstream termination unit, which can represent, for example, a customer device, customer premises (e.g., an apartment building), a business user, or an optical network unit (ONU). In an embodiment, system 100 utilizes a coherent Dense Wavelength Division Multiplexing (DWDM) PON architecture.

Optical hub 102 communicates with fiber node 104 by way of downstream fiber 108. Optionally, where upstream communication is desired along system 100, optical hub 102 further connects with fiber node 104 by way of upstream fiber 110. In operation, downstream fiber 108 and upstream fiber 110 are typically 30 km or shorter. However, according to the embodiments presented herein, greater lengths are contemplated, such as between 100 km and 1000 km. In an embodiment, fiber node 104 connects with end device 106 by way of fiber optics 112. Alternatively, fiber node 104 and end device 106 may be integrated as a single device, which may be located at a customer premises or at the fiber node 104 if node management capabilities are intended through an end device 106. Where fiber node 104 and end device 106 are separate devices, fiber optics 112 typically spans a distance of approximately 5000 feet or less. In some cases, fiber optics 112 may include two cascading fiber nodes 104 where the fiber optics 112 may span distances greater than 5000 feet.

Optical hub 102 includes an optical frequency comb generator 114, which may be configured to receive a high quality source signal 116 from an external laser 118 and thereby generate multiple coherent tones 120(1), 120(1'), . . . 120(N), 120(N'). Optical frequency comb generator 114 utilizes, for example, a mode-locked laser, a gain-switched laser, or electro-optic modulation, and is constructed such that multiple coherent tones 120 are generated as simultaneous low-linewidth wavelength channels of known and controllable spacing. Alternatively (e.g., to optical frequency comb generator 114), multiple high quality laser sources may be tuned to wavelengths that are spaced apart to generate the multiple coherent tones 120(1), 120(1'), . . . 120(N), 120(N'). This advantageous aspect of the upstream input signal into system 100 allows a simplified architecture throughout the entire downstream portion of system 100, as described further below.

Generated coherent tones 120 are fed into an amplifier 122, and the amplified signal therefrom is input into a first hub optical demultiplexer 124. In an embodiment, amplifier 122 is an erbium-doped fiber amplifier (EDFA). Optical hub 102 further includes a downstream transmitter 126 and a hub optical multiplexer 128. In an embodiment, optical hub 102 optionally includes a hub optical splitter 130, an upstream receiver 132, and a second hub optical demultiplexer 134.

Downstream transmitter 126 includes a downstream optical circulator 136 and a downstream modulator 138. In an embodiment, downstream modulator 138 is an injection locked laser modulator. Upstream receiver 132 includes an upstream integrated coherent receiver (ICR) 140, an upstream analog to digital converter (ADC) 142, and an upstream digital signal processor (DSP) 144. In the embodiment, fiber node 104 includes a node optical demultiplexer 146. In an alternative embodiment, where upstream transmission is desired, fiber node 104 further includes a node optical multiplexer 148. In the embodiment, node optical demultiplexer 146 and node optical multiplexer 148 are passive devices.

End device 106 further includes a downstream receiver 150. In an embodiment, downstream receiver 150 has a similar architecture to upstream receiver 132, and includes a downstream ICR 152, a downstream ADC 154, and a downstream DSP 156. For upstream transmission, end device 106 optionally includes end device optical splitter 158, which may be located within downstream receiver 150 or separately, and an upstream transmitter 160. In an embodiment, upstream transmitter 160 has a similar architecture to downstream transmitter 126, and includes an upstream optical circulator 162, and an upstream modulator 164.

In operation, system 100 utilizes optical frequency comb generator 114 and amplifier 122 convert the input high quality source signal 116 into multiple coherent tones 120 (e.g., 32 tones, 64 tones, etc.), which are then input to first hub optical demultiplexer 124. In an embodiment, high quality source signal 116 is of sufficient amplitude and a narrow bandwidth such that a selected longitudinal mode of signal 116 is transmitted into optical frequency comb generator 114 without adjacent longitudinal modes, which are suppressed prior to processing by comb generator 114. First hub optical demultiplexer 124 then outputs a plurality of phase synchronized coherent tone pairs 166(1), 166(2), . . . 166(N). That is, the generated coherent frequency tones 120 are amplified by amplifier 122 to enhance optical power, and then demultiplexed into multiple separate individual phased synchronized coherent tone source pairs 166. For simplicity of discussion, the following description pertains only to coherent tone pair 166(1) corresponding to the synchronized pair signal for the first channel output, which includes a first unmodulated signal 168 for Ch1 and a second unmodulated signal 170 for Ch1', and their routing through system 100.

With source signal 116 of a high quality, narrow band, and substantially within a single longitudinal mode, coherent tone pair 166(1), including first unmodulated signal 168 (Ch1) and second unmodulated signal 170 (Ch1'), is output as a high quality, narrowband signal, which then serves as both a source of seed and local oscillator (LO) signals for both downstream and upstream transmission and reception directions of system 100. That is, by a configuration, the architecture of optical frequency comb generator 114 advantageously produces high quality continuous wave (CW) signals. Specifically, first unmodulated signal 168 (Ch1) may function as a downstream seed and upstream LO throughout system 100, while second unmodulated signal 170 (Ch1') concurrently may function as an upstream seed and downstream LO for system 100.

According to the embodiment, within optical hub 102, first unmodulated signal 168 (Ch1) is divided by hub optical splitter 130 and is separately input to both downstream transmitter 126 and upstream receiver 132 as a "pure" signal, and i.e., substantially low amplitude, narrow bandwidth continuous wave does not include adhered data. First unmodulated signal 168 (Ch1) thus becomes a seed signal for downstream transmitter 126 and an LO signal for upstream receiver 132. In an embodiment, within downstream transmitter 126, first unmodulated signal 168 (Ch1) passes through downstream optical circulator 136 into downstream modulator 138, in which one or more laser diodes (not shown in FIG. 1, described below with respect to FIGS. 2-5) are excited, and adhere data (also not shown in FIG. 1, described below with respect to FIGS. 2-5) to the signal that then exits downstream optical circulator 136 as downstream modulated data stream 172 (Ch1).

In an embodiment, downstream optical circulator 136 is within downstream transmitter 126. Alternatively, downstream optical circulator 136 may be physically located separately from downstream transmitter 126, or else within the confines of downstream modulator 138. Downstream modulated data stream 172 (Ch1) is then combined in hub optical multiplexer 128 with the plurality of modulated/unmodulated data stream pairs from other channels (not shown) and transmitted over downstream fiber 108, to a node optical demultiplexer 174 in fiber node 104, which then separates the different channel stream pairs for transmission to different respective end devices 106. At end device 106, because the data stream pair 170, 172 entering downstream receiver 150 is a phase synchronized, digital signal processing at downstream DSP 156 is greatly simplified, as described below with respect to FIG. 7.

Where upstream reception is optionally sought at optical hub 102, second unmodulated signal 170 (Ch1') is divided, within end device 106, by end device optical splitter 158 and is separately input to both downstream receiver 150 and upstream transmitter 160 as a "pure" unmodulated signal for Ch1'. In this alternative embodiment, second unmodulated signal 170 (Ch1') thus functions a seed signal for upstream transmitter 160 and a "pseudo LO signal" for downstream receiver 150 for the coherent detection of Ch1. For purposes of this discussion, second unmodulated signal 170 (Ch1') is referred to as a "pseudo LO signal" because it uses an LO signal from a remote source (output from first hub optical demultiplexer 124), and is not required to produce an LO signal locally at end device 106. This particular configuration further significantly reduces cost and complexity of the architecture of the system 100 by the reduction of necessary electronic components.

For upstream transmission, in an embodiment, a similar coherent detection scheme is implemented for upstream transmitter 160 as is utilized for downstream transmitter 126. That is, second unmodulated signal 170 (Ch1') is input to upstream optical circulator 162 and modulated by upstream modulator 164 to adhere symmetric or asymmetric data (not shown, described below with respect to FIG. 6) utilizing one or more slave lasers (also not shown, described below with respect to FIG. 6), and then output as an upstream modulated data stream 176 (Ch1'), which is then combined with similar modulated data streams from other channels (not shown) by a node multiplexer 178 in fiber node 104. Second unmodulated signal 170 (Ch1') is then transmitted upstream over upstream fiber 110, separated from other channel signals by second hub optical demultiplexer 134, an input to upstream receiver 132, for simplified digital signal processing similar to the process described above with respect to downstream receiver 150.

By this configuration, multiple upstream channels from different end devices 106 can be multiplexed at fiber node 104 (or a remote node) and sent back to optical hub 102. Thus, within optical hub 102, the same coherent detection scheme may be used at upstream receiver 132 as is used with downstream receiver 150, except that upstream receiver 132 utilizes first unmodulated signal 168 (Ch1) as the LO and upstream modulated data stream 176 (Ch1') to carry data, whereas downstream receiver 150 utilizes the data stream pair (Ch1, Ch1') in reverse. That is, downstream receiver 150 utilizes second unmodulated signal 170 (Ch1') as the LO and downstream modulated data stream 172 (Ch1) to carry data.

Implementation of the embodiments described herein are useful for migrating hybrid fiber-coaxial (HFC) architectures towards other types of fiber architectures, as well as deeper fiber architectures. Typical HFC architectures tend to have very few fiber strands available from fiber node to hub (e.g. fibers 108, 110), but many fiber strands could be deployed to cover the shorter distances that are typical from legacy HFC nodes to end devices (e.g., fiber optics 112). In the embodiments described herein, two fibers (i.e., fibers 108, 110) are illustrated between optical hub 102 and fiber node 104, which can be a legacy HFC fiber node. That is, one fiber (i.e., downstream fiber 108) is utilized for downstream signal and upstream seed/downstream LO, and another fiber (i.e., upstream fiber 110) is utilized for upstream signal. Additionally, three fibers (i.e., fiber optics 112A-C) are illustrated for each end device from fiber node 104 (e.g., legacy HFC fiber node) to end device 106. By utilization of the advantageous configurations herein, fiber deeper or all-fiber migration schemes can utilize an HFC fiber node as an optical fiber distribution node, thereby greatly minimizing the need for fiber retrenching from an HFC node to an optical hub.

The architecture described herein, by avoiding the need for conventional compensation hardware, can therefore be structured as a significantly less expensive and more compact physical device than conventional devices. This novel and advantageous system and subsystem arrangement allows for multi-wavelength emission with simplicity, reliability, and low cost. Implementation of optical frequency comb generator 114, with high quality input source signal 116, further allows simultaneous control of multiple sources that are not realized by conventional discrete lasers. According to the embodiments herein, channel spacing, for example, may be 25 GHz, 12.5 GHz, or 6.25 GHz, based on available signal bandwidth occupancy.

The embodiments described herein realize still further advantages by utilizing a comb generator (i.e., optical frequency comb generator 114) that maintains a constant wavelength spacing, thereby avoiding optical beat interference (OBI) that may be prevalent in cases with simultaneous transmissions over a single fiber. In the embodiment illustrated in FIG. 1, fiber node 104 is shown as a passive system, and is thus expected to maintain a higher reliability than other migration approaches. Nevertheless, one of ordinary skill in the art, after reading and comprehending present application, will understand how the embodiments disclosed herein may also be adapted to a remote physical solution, or to a remote cable modem termination system (CMTS) that is included in the fiber node.

As illustrated and described herein, system 100 may utilize an architecture of coherent DWDM-PON incorporate novel solutions to meet the unique requirements of access environment, but with cost-efficient structures not seen in conventional hardware systems. Optical frequency comb generator 114 produces a plurality of simultaneous narrow width wavelength channels with controlled spacing, thereby allowing simplified tuning of the entire wavelength comb. This centralized comb light source in optical hub 102 therefore provides master seeding sources and LO signals for both downstream and upstream directions in heterodyne detection configurations in order to reuse the optical sources throughout the entirety of system 100. This advantageous configuration realizes significant cost savings and reduction in hardware complexity over intradyne detection schemes in long-haul systems, for example.

Figure 2:
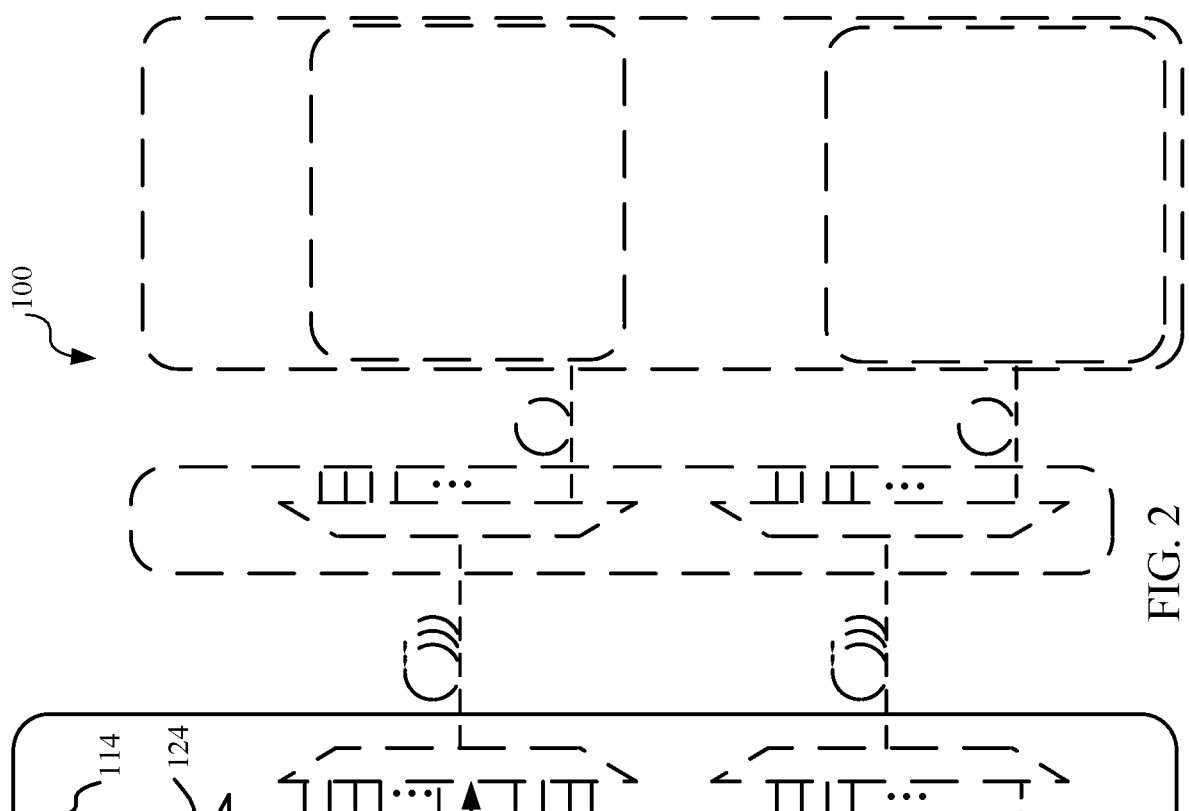
FIGS. 2-5 are schematic illustrations depicting a transmitter that can be utilized with the fiber communication system depicted in FIG. 1.
Figure 2:
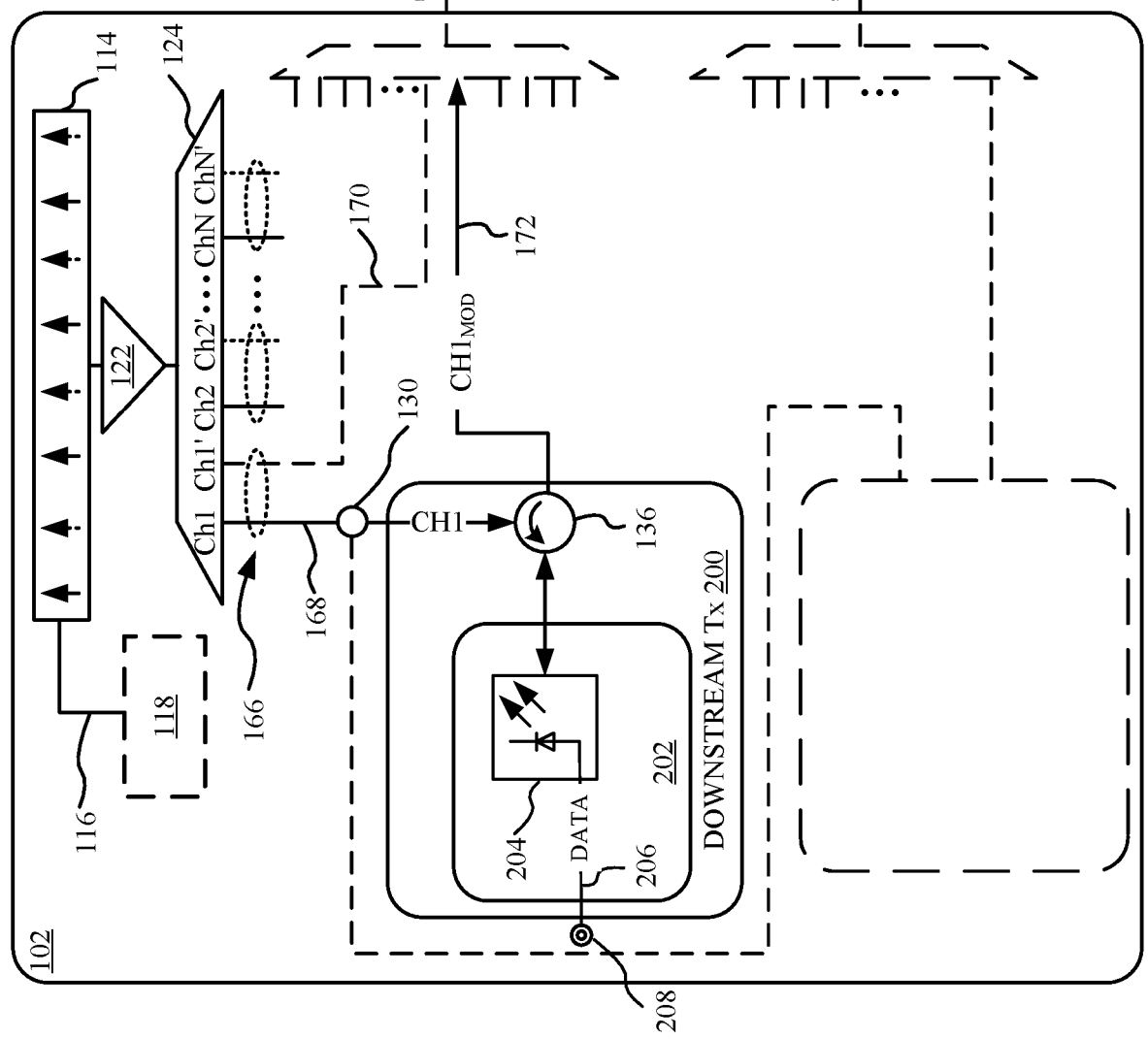

FIG. 2 is a schematic illustration depicting a downstream transmitter 200 that can be utilized with fiber communication system 100, depicted in FIG. 1. Downstream transmitter 200 includes downstream optical circulator 136 (see FIG. 1, above) in two-way communication with a laser injected modulator 202, which includes a laser diode 204, which receives data 206 from an external data source 208. In an alternative embodiment, downstream transmitter 200 may include two separate fiber receivers (not shown), which would substitute, and eliminate the need, for downstream optical circulator 136 in the structural configuration shown.

In operation, downstream transmitter 200 performs the same general functions as downstream transmitter 126 (FIG. 1, described above). Laser injected modulator 202 utilizes laser diode 204 as a "slave laser." That is, laser diode 204 is injection locked by external laser 118, which functions as a single frequency or longitudinal mode master, or seed, laser to keep the frequency of a resonator mode of laser diode 204 close enough to the frequency of the master laser (i.e., laser 118) to allow for frequency locking. The principle of downstream transmitter 200 is also referred to as "laser cloning," where a single high quality master laser (i.e., laser 118) transmits a narrow bandwidth, low noise signal (i.e., source signal 116), and a relatively inexpensive slave laser (e.g., laser diode 204) can be used throughout system 100 to transmit data modulated signals, such as downstream modulated data stream 172 (Ch1). In an embodiment, laser diode 204 is a Fabry Perot laser diode (FP LD), or a vertical-cavity surface-emitting laser (VCSEL), in comparison with the considerably more expensive distributed feedback laser diodes (DFB LD) that are conventionally used. In an alternative embodiment, laser diode 204 is an LED, which can perform as a sufficient slave laser source according to the embodiments herein due to the utilization of the high quality source signal 116 that is consistently utilized throughout system 100.

More specifically, first unmodulated signal 168 (Ch1) exiting hub optical splitter 130 is input to downstream optical circulator 136, which then excites laser diode 204, that is, laser diode 204 emits light at a specified modulation rate. Laser injected modulator 202 adheres data 206 to the excited Ch1 signal, and the resultant modulated Ch1 signal with adhered data is output from downstream optical circulator 136 as downstream modulated data stream 172 (Ch1). According to this embodiment, first unmodulated signal 168 (Ch1) is input to downstream transmitter 126 as an unmodulated, low amplitude, narrow bandwidth, low noise "pure" source, and is modulated by laser diode 204, which is a high amplitude, wide bandwidth device, and resultant downstream modulated data stream 172 (Ch1) is a high amplitude, narrow bandwidth, low noise "pure" signal that can be transmitted throughout system 100 without the need for further conventional compensation means (hardware and programming). Suppression of adjacent longitudinal modes from laser diode 204, for example, is not necessary because of the exciting source signal (i.e., signal 168) is of such high quality and narrow bandwidth that output downstream modulated data stream 172 (Ch1) is substantially amplified only within the narrow bandwidth of external laser 118. In the embodiment illustrated in FIG. 2, laser injected modulator 202 implements direct modulation.

Optical injection locking as described herein thus improves upon the performance of the relatively less expensive, multi-longitudinal slave laser source (i.e., laser diode 204) in terms of spectral bandwidth and noise properties. With respect to heterodyne coherent detection, incoming signals (upstream or downstream) can be combined with the LO or pseudo-LO and brought to an intermediate frequency (IF) for electronic processing. According to this configuration, part of the LO/pseudo-LO optical power can also be employed as the master/seed laser for the reverse transmission direction, at both optical hub 102, and at end device 106 (described below with respect to FIG. 6), and thus a fully coherent system having a master seed and LO delivery from an optical hub can be achieved in a relatively cost-effective manner comparison with conventional systems.

Figure 3:
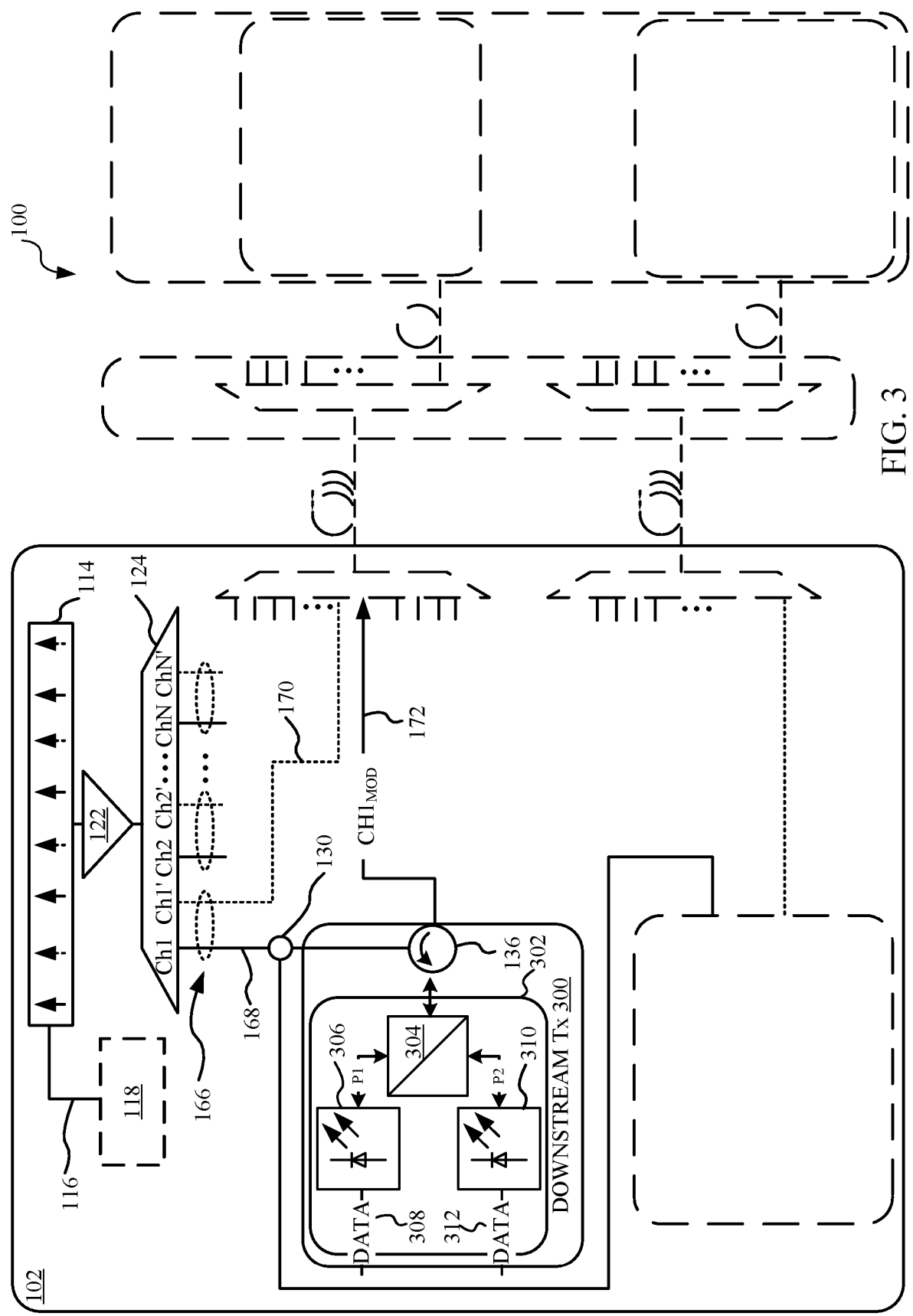

FIG. 3 is a schematic illustration depicting an alternative downstream transmitter 300 that can be utilized with fiber communication system 100, depicted in FIG. 1. Downstream transmitter 300 is similar to downstream transmitter 200 (FIG. 2), including the implementation of direct modulation, except that downstream transmitter 300 alternatively utilizes polarization division multiplexing to modulate the Ch1 signal into downstream modulated data stream 172 (Ch1).

Downstream transmitter 300 includes downstream optical circulator 136 (see FIG. 1, above) in two-way communication with a laser injected modulator 302, which includes a polarization beam splitter (PBS)/polarization beam combiner (PBC) 304, which can be a single device. Laser injected modulator 302 further includes a first laser diode 306 configured to receive first data 308 from an external data source (not shown in FIG. 3), and a second laser diode 310 configured to receive second data 312 from the same, or different, external data source.

In operation, downstream transmitter 300 is similar to downstream transmitter 200 with respect to the implementation of direct modulation, and master/slave laser injection locking. Downstream transmitter 300 though, alternatively implements dual-polarization from the splitter portion of PBS/PBC 304, which splits first unmodulated signal 168 (Ch1) into its x-polarization component P1 and y-polarization component P2, which separately excite first laser diode 306 and second laser diode 310, respectively. Similar to downstream transmitter 200 (FIG. 2), in downstream transmitter 300, first unmodulated signal 168 (Ch1) exiting hub optical splitter 130 is input to downstream optical circulator 136, the separate polarization components of which then excite laser diodes 306, 310, respectively, at the specified modulation rate. Laser injected modulator 302 adheres data first and second data 308, 312 to the respective excited polarization components of the Ch1 signal, which are combined by the combiner portion of PBS/PBC 304. The resultant modulated Ch1 signal with adhered data is output from downstream optical circulator 136 as downstream modulated data stream 172 (Ch1).

In an embodiment, the polarized light components received by first and second laser diodes 306, 310 are orthogonal (90 degrees and/or noninteractive). That is, first laser diode 306 and second laser diode 310 are optimized as slave lasers to lock onto the same wavelength as external laser 118 (master), but with perpendicular polarization directions. By this configuration, large data packets (e.g., first data 308 and second data 312) can be split and simultaneously sent along separate pathways before recombination as downstream modulated data stream 172 (Ch1). Alternatively, first data 308 and second data 312 may come from two (or more) separate unrelated sources. The orthogonal split prevents data interference between the polarized signal components. However, one of ordinary skill in the art will appreciate that, according to the embodiment of FIG. 3, first unmodulated signal 168 (Ch1) can also be polarized at 60 degrees, utilizing similar principles of amplitude and phase, as well as wavelength division. First unmodulated signal 168 (Ch1) can alternatively be multiplexed according to a spiral or vortex polarization, or orbital angular momentum. Additionally, whereas the illustrated embodiment features polarization multiplexing, space division multiplexing and mode division multiplexing may be also alternatively implemented.

According to this embodiment, master continuous wave signal for Ch1, namely, first unmodulated signal 168, is received from optical frequency comb generator 114 and is split to be used, in the first part, as the LO for upstream receiver 132, and in the second part, to synchronize two slave lasers (i.e., first laser diode 306 and second laser diode 310) by the respective x-polarization and y-polarization light portions such that both slave lasers oscillate according to the wavelength of the master laser (i.e., external laser 118). Data (i.e., first data 308 and second data 312) is directly modulated onto the two slave lasers, respectively. This injection locking technique thus further allows for frequency modulation (FM) noise spectrum control from the master laser to the slave laser, and is further able to realize significant improvements in FM noise/phase jitter suppression and emission linewidth reduction.

As described herein, utilization of optical injection with a dual-polarization optical transmitter (e.g., downstream transmitter 300) by direct modulation may advantageously implement relatively lower-cost lasers to perform the functions of conventional lasers that are considerably more expensive. According to this configuration of a dual-polarization optical transmitter by direct modulation of semiconductor laser together with coherent detection, the present embodiments are particular useful for short-reach applications in terms of its lower cost and architectural compactness. Similar advantages may be realized for long reach applications.

Figure 4:
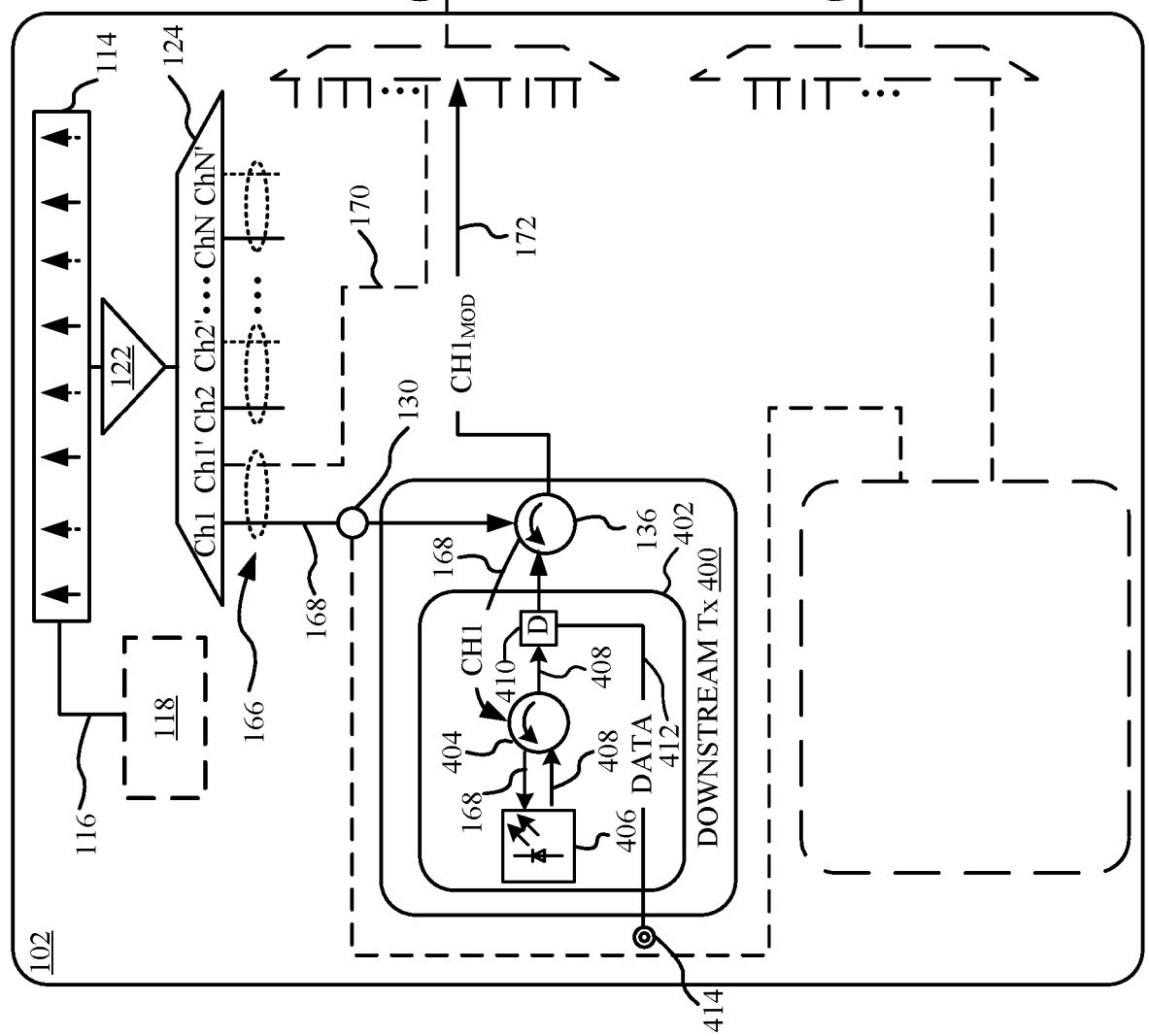

FIG. 4 is a schematic illustration depicting an alternative downstream transmitter 400 that can be utilized with fiber communication system 100, depicted in FIG. 1. Downstream transmitter 400 is similar to downstream transmitter 200 (FIG. 2), except that downstream transmitter 400 alternatively implements external modulation, as opposed to direct modulation, to modulate the Ch1 signal into downstream modulated data stream 172 (Ch1). Downstream transmitter 400 includes downstream optical circulator 136 (see FIG. 1, above) and a laser injected modulator 402. Downstream optical circulator 136 is in one-way direct communication with a separate external optical circulator 404 that may be contained within laser injected modulator 402 or separate. Laser injected modulator 402 further includes a laser diode 406, which receives the low amplitude, narrow bandwidth, first unmodulated signal 168 (Ch1) and emits an excited, high amplitude, narrow bandwidth, optical signal 408 back to external optical circulator 404. Laser injected modulator 402 still further includes an external modulating element 410, which receives data 412 from an external data source 414, and adheres data 412 with optical signal 408 to be unidirectionally received back by downstream optical circulator 136 and output as downstream modulated data stream 172 (Ch1).

In this embodiment, downstream transmitter 400 performs the same general functions as downstream transmitter 126 (FIG. 1, described above), but uses external modulation as the injection locking mechanism to lock laser diode 406 to the wavelength of the master laser source (e.g., external laser 118). To implement external modulation, this embodiment regulates optical signal flow through mostly unidirectional optical circulators (i.e., downstream optical circulator 136, external optical circulator 404). External modulating element 410 may optionally include a demultiplexing filter (not shown) as an integral component, or separately along the signal path of downstream modulated data stream 172 (Ch1) prior to input by downstream receiver 150. In an embodiment, external modulating element 410 is a monitor photodiode, and injection locking is performed through a rear laser facet.

Figure 5:
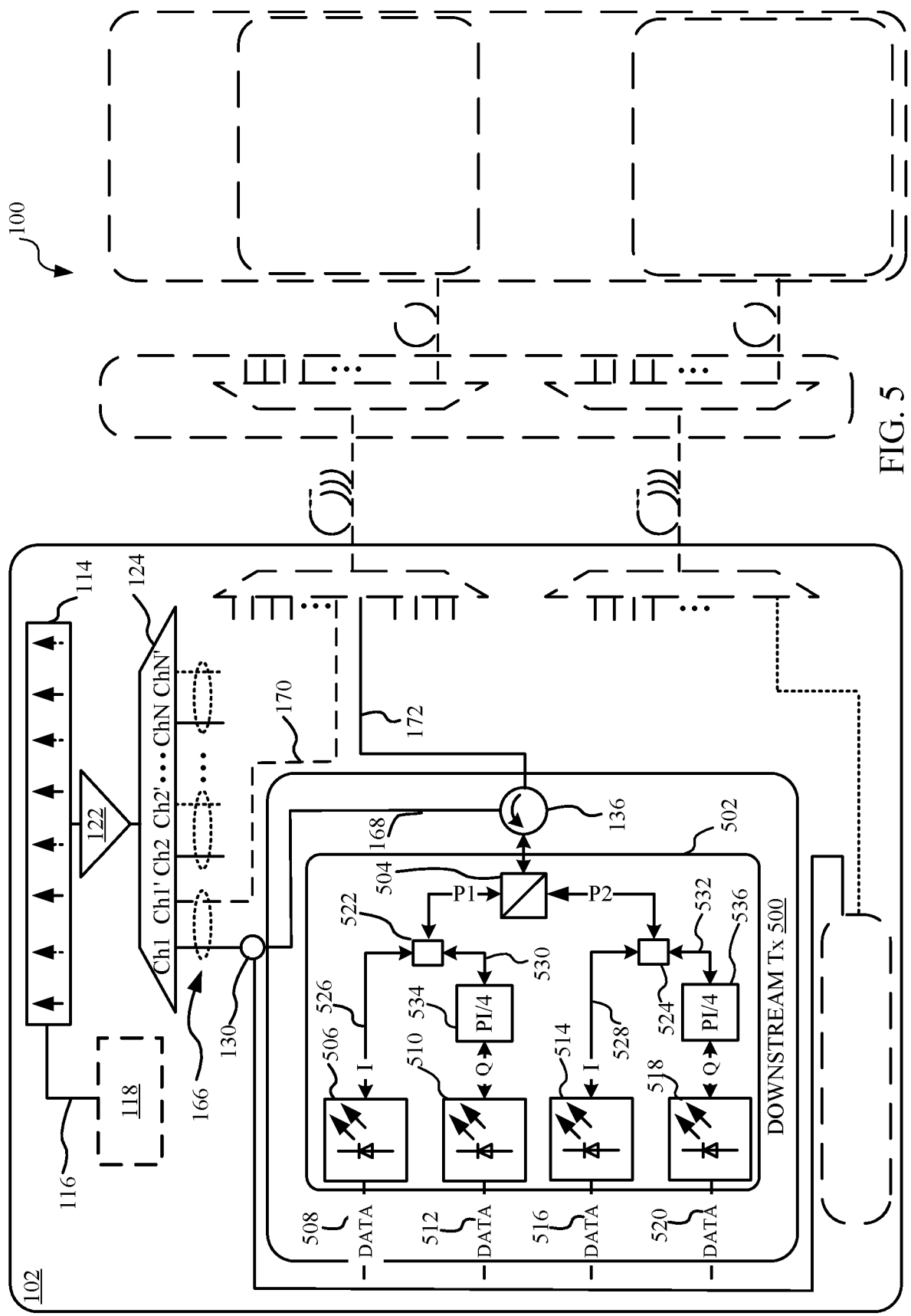

FIG. 5 is a schematic illustration depicting an alternative downstream 500 transmitter that can be utilized with fiber communication system 100, depicted in FIG. 1. Downstream transmitter 500 is similar to downstream transmitter 300 (FIG. 3), including the implementation of direct modulation and polarization division multiplexing, except that downstream transmitter 500 further implements quadrature amplitude modulation (QAM) to modulate the Ch1 signal into downstream modulated data stream 172 (Ch1). That is, further external modulating elements may be utilized per polarization branch (FIG. 2, above) to generate QAM signals.

Downstream transmitter 500 includes downstream optical circulator 136 (see FIG. 1, above) in two-way communication with a laser injected modulator 502, which includes a PBS/PBC 504, which can be a single device or two separate devices. Additionally, all of the components of laser injected modulator 502 may themselves be separate devices, or alternatively all contained within a single photonic chip. Laser injected modulator 502 further includes a first laser diode 506 configured to receive first data 508 from an external data source (not shown in FIG. 5), a second laser diode 510 configured to receive second data 512 from the same, or different, external data source, a third laser diode 514 configured to receive third data 516 from the same/different, external data source, and a fourth laser diode 518 configured to receive fourth data 520 from the same/different external data source.

In operation, downstream transmitter 500 implements dual-polarization from the splitter portion of PBS/PBC 504, which splits first unmodulated signal 168 (Ch1) into its x-polarization component (P1) and y-polarization component (P2). Each polarization component P1, P2 is then input to first non-polarized optical splitter/combiner 522 and second non-polarized optical splitter/combiner 524, respectively. First and second optical splitters/combiners 522, 524 each then further split their respective polarization components P1, P2 into their I-signals 526, 528, respectively, and also into their Q-signals 530, 532, respectively. Generated I-signals 526, 528 then directly excite laser diodes 506, 514, respectively. Before directly communicating with laser diodes 510, 518, respectively, generated Q-signals 530, 532 first pass through first and second quadrature phase shift elements 534, 536, respectively, each of which shifts the Q-signal by 45 degrees in each direction, such that the respective Q-signal is offset by 90 degrees from its respective I-signal when recombined at splitters/combiners 522, 524.

The resultant modulated Ch1 signal, with adhered data, is output from downstream optical circulator 136 of downstream transmitter 500 as downstream modulated data stream 172 (Ch1), and as a polarized, multiplexed QAM signal. According to this embodiment, utilization of a photonic integrated circuit allows for directly modulated polarization of a multiplexed coherent system, but utilizing significantly lower cost hardware configurations than are realized by conventional architectures. In an embodiment, laser diodes 506, 510, 514, 516 are PAM-4 modulated laser diodes capable of generating 16-QAM polarization multiplexed signals.

Figure 6:
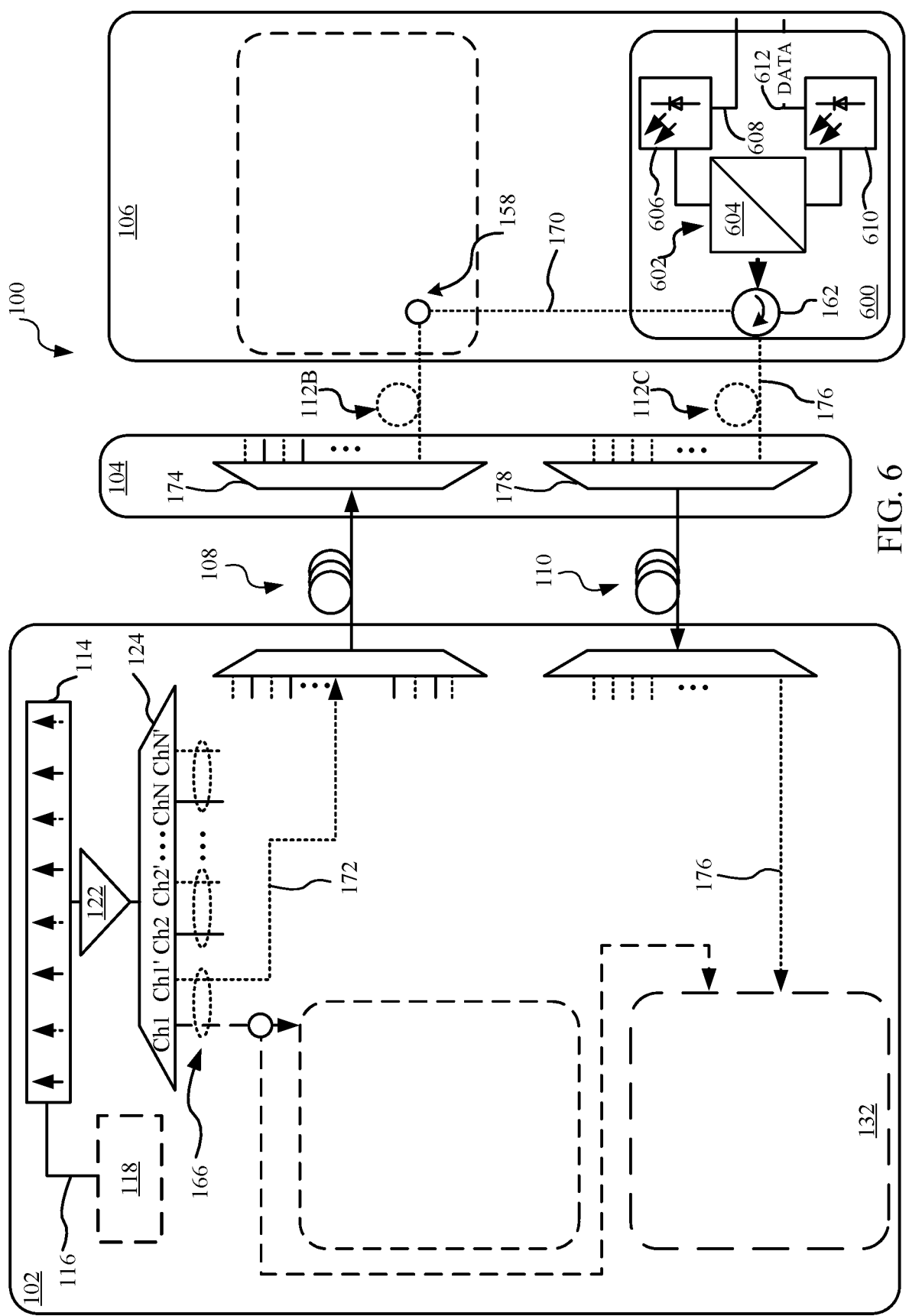
FIG. 6 is a schematic illustration depicting an upstream connection that can be utilized with the fiber communication system depicted in FIG. 1.

FIG. 6 is a schematic illustration depicting an upstream transmitter 600 that can be utilized with the fiber communication system 100, depicted in FIG. 1. In the embodiment illustrated in FIG. 6, upstream transmitter 600 is similar to downstream transmitter 300 (FIG. 3) in structure and function. Specifically, upstream transmitter 600 includes upstream optical circulator 162 (see FIG. 1, above) in two-way communication with a laser injected modulator 602 (not separately illustrated in FIG. 6), which includes a PBS/PBC 604, which can be a single device or separate devices. Laser injected modulator 602 further includes a first laser diode 606 configured to receive first data 608 from an external data source (not shown in FIG. 6), and a second laser diode 610 configured to receive second data 612 from the same, or different, external data source. Similar to the embodiments of FIGS. 2-5, above, downstream transmitter 600 may also eliminate for upstream optical circulator 162 by the utilization of at least two separate fiber receivers (not shown).

Upstream transmitter 600 is thus nearly identical to downstream transmitter 300 (FIG. 3), except that upstream transmitter 600 utilizes second unmodulated signal 170 (Ch1') as the end device seed source, in laser injected modulator 602, to combine or adhere with data (e.g., first data 608, second data 612) to generate upstream modulated data stream 176 (Ch1') to carry upstream data signals to an upstream receiver (e.g., upstream receiver 132). In operation, first laser diode 606 and second laser diode 610 also function as slave lasers by injection locking to the master signal from external laser 118. That is, symmetric or asymmetric data for Ch1' (e.g., first data 608, second data 612) is modulated onto the two slave lasers (i.e., first laser diode 606 and second laser diode 610) with polarization multiplexing, much the same as the process implemented with respect to downstream transmitter 300 (FIG. 3) in optical hub 102.

In this example, upstream transmitter 600 is illustrated to substantially mimic the architecture of downstream transmitter 300 (FIG. 3). Alternatively, upstream transmitter 600 could equivalently mimic the architecture of one or more of downstream transmitters 200 (FIG. 2), 400 (FIG. 4), or 500 (FIG. 5) without departing from the scope of the present disclosure. Furthermore, upstream transmitter 600 can conform to any of the embodiments disclosed by FIGS. 2-5, irrespective of the specific architecture of the particular downstream transmitter utilized within optical hub 102. By utilization of high-quality, narrow bandwidth, low noise external laser source 118, the master/slave laser relationship carries through the entirety of system 100, and the plurality of end devices 106 that receive modulated/unmodulated signal pairs (which may be 32, 64, 128, or as many as 256 from a single fiber line pair, e.g., downstream fiber 108 and upstream fiber 110).

The significant cost savings according to the present embodiments are thus best realized when considering that as many as 512 downstream transmitters (e.g., downstream transmitter 126, FIG. 1) and upstream transmitters (e.g., upstream transmitter 160, FIG. 1) may be necessary to fully implement all available chattel pairs from a single optical hub 102. The present embodiments implement a significantly lower cost and less complex hardware architecture to utilize the benefits accruing from implementation of high-quality external laser 118, without having to add expensive single longitudinal mode laser diodes, or other compensation hardware necessary to suppress adjacent longitudinal modes from inexpensive lasers or the noise components produced thereby.

Figure 7:
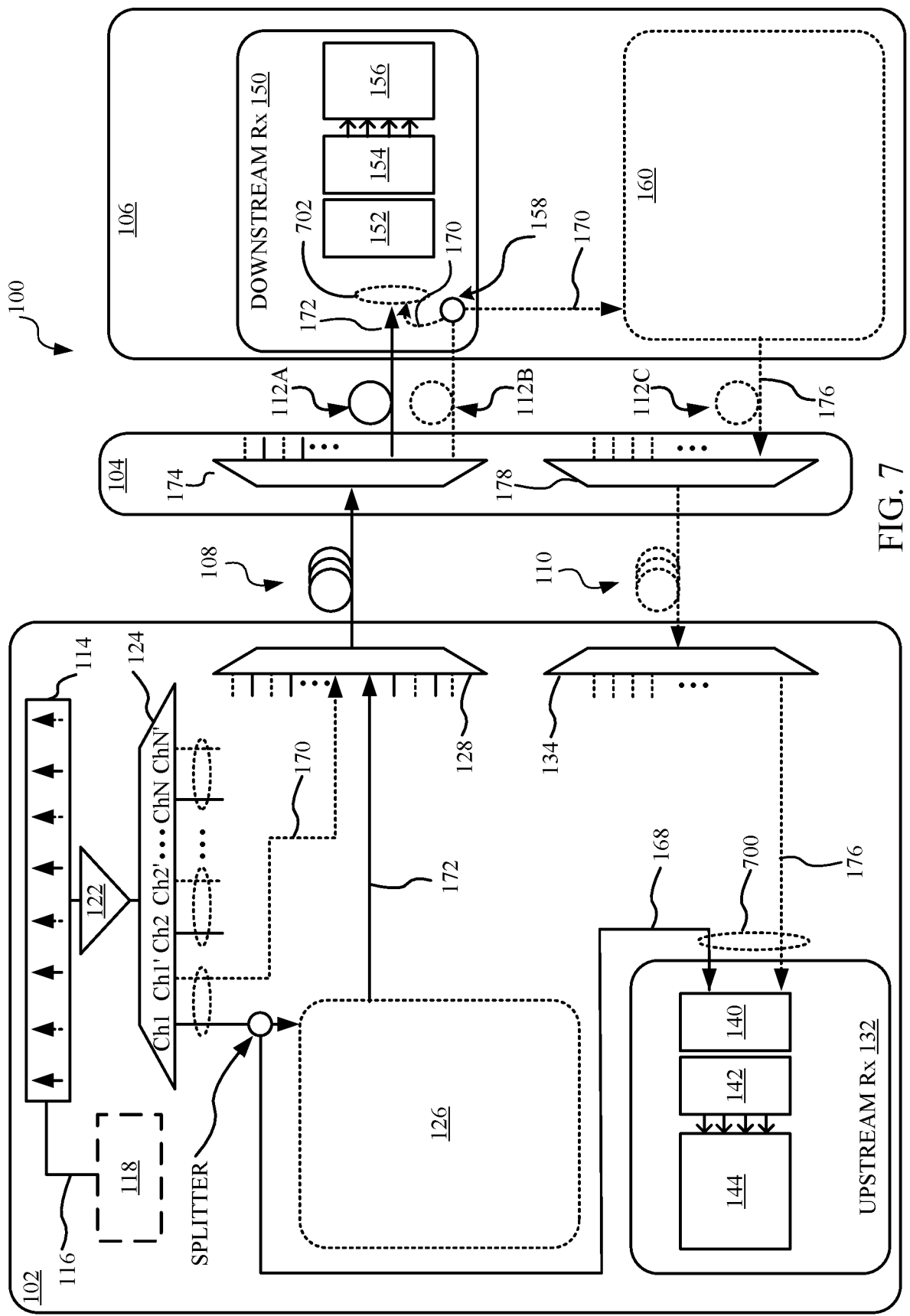
FIG. 7 is a schematic illustration depicting a processing architecture implemented with the fiber communication system depicted in FIG. 1.

FIG. 7 is a schematic illustration depicting a processing architecture which can be implemented for upstream receiver 132, downstream receiver 150, and fiber communication system 100, depicted in FIG. 1. The respective architectures of upstream receiver 132 and downstream receiver 150 are similar with respect to form and function (described above with respect to FIG. 1), except that upstream receiver 132 receives a first data stream pair 700 for Ch1, Ch1', in reverse of a second data stream pair 702, which is received by downstream receiver 150. In other words, as described above, first data stream pair 700 includes first unmodulated signal 168 (Ch1) as the LO and upstream modulated data stream 176 (Ch1') to carry data, whereas second data stream pair 702 includes unmodulated signal 170 (Ch1') as the LO and downstream modulated data stream 172 (Ch1) to carry data.

First and second data stream pairs 700, 702 the multiplexed phase synchronized pairs modulated/unmodulated of optical signals that are converted into analog electrical signals by ICR 140 and ICR 152, respectively. The respective analog signals are then converted into digital domain by ADC 142 and ADC 154, for digital signal processing by DSP 144 and DSP 156. In an embodiment, digital signal processing may be performed by a CMOS ASIC employing very large quantities of gate arrays. A conventional CMOS ASIC, for example, can utilize as many as 70 million gates to process incoming digitized data streams. In the conventional systems, modulated data streams for Ch1 and Ch1' are processed independently, which requires significant resources to estimate frequency offset, drift, and digital down conversion compensation factors (e.g., $e^{-j\omega t}$, where $\omega$ represents the frequency difference between first unmodulated signal 168 and upstream modulated data stream 176, and $\omega$ is held constant for coherent tone pair 166, as extended throughout system 100).

According to the embodiments disclosed herein, on the other hand, the modulated and unmodulated signals from Ch1 and Ch1' are phase synchronized together such that the difference between ω of the signal pair is always known, and phase synchronized to maintain a constant relationship. In contrast, conventional systems are required to constantly estimate the carrier phase to compensate for factors such as draft which requires considerable processing resources, as discussed above. According to the present embodiments though, since Ch1 and Ch1' are synchronized together as first and second data stream pairs 700, 702, the offset co between the pairs 700, 702 need not be estimated, since it may be instead easily derived by a simplified subtraction process in DSP 144 and DSP 156 because the signal pairs will drift together by the same amount in a constant relationship. By this advantageous configuration and process, digital signal processing by a CMOS ASIC can be performed utilizing as few as one million gates, thereby greatly improving the processing speed of the respective DSP, and/or reducing the number of physical chips required to perform the processing (or similarly increasing the amount of separate processing that may be performed by the same chip). At present, implementation of the embodiments described herein may improve downstream and upstream data transmission speeds by as much as 5000 times faster than conventional systems.

Figure 8:
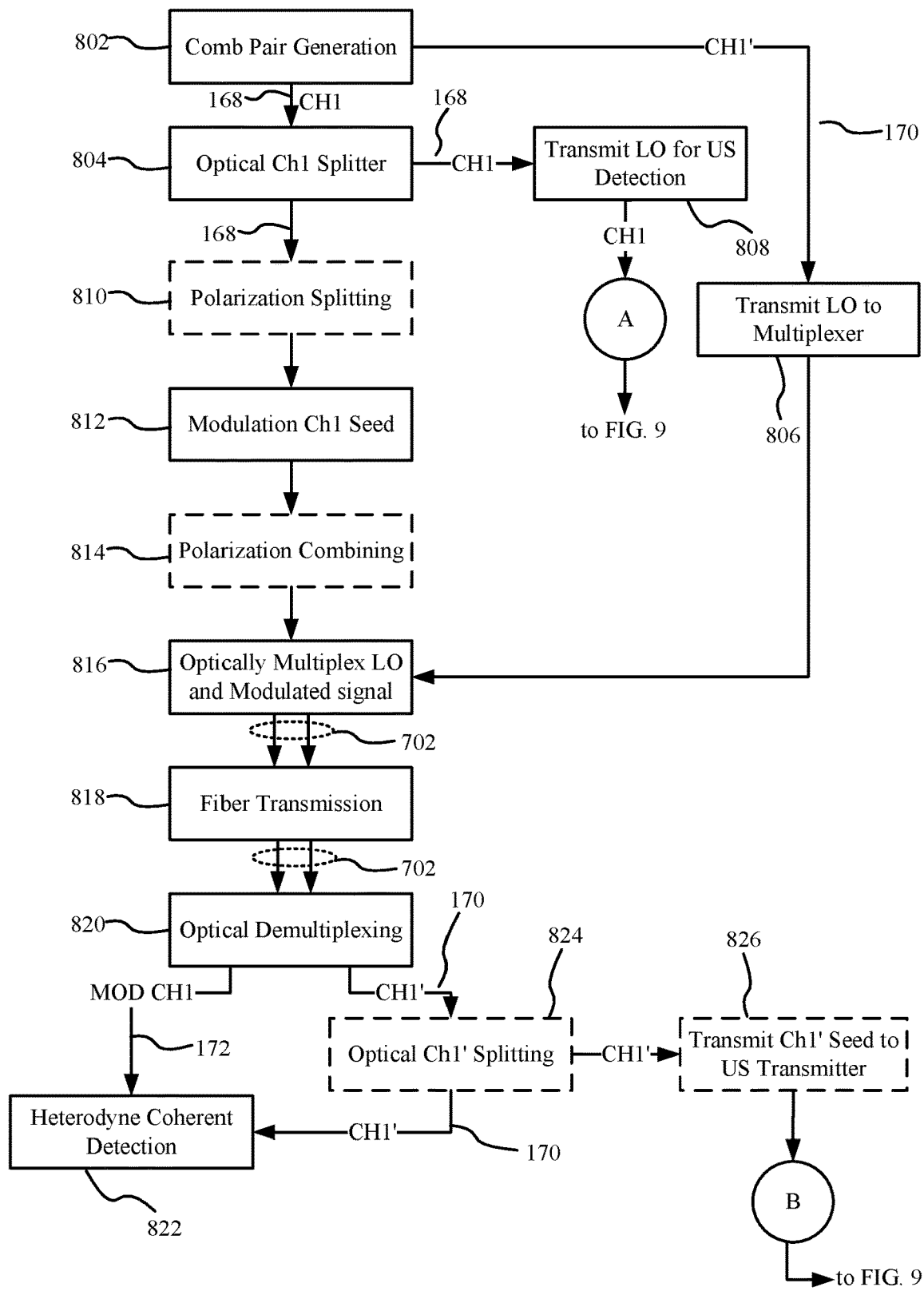
FIG. 8 is a flow chart diagram of a downstream optical network process.

FIG. 8 is a flow chart diagram of a downstream optical network process 800 that can be implemented with fiber communication system 100, depicted in FIG. 1. Process 800 begins at step 802. In step 802, coherent tone pairs 166 are generated and output by optical frequency comb generator 114, amplifier 122, and first hub optical demultiplexer 124. Similar to the discussion above, for simplification purposes, the following discussion addresses specific coherent tone pair 166(1) for Ch1, Ch1'. Coherent tone pair 166 includes first unmodulated signal 168 (Ch1) and second unmodulated signal 170 (Ch1'). Once coherent tone pair 166 is generated, process 800 proceeds from step 802 to steps 804 and 806, which may be performed together or simultaneously.

In step 804, first unmodulated signal 168 (Ch1) is input to an optical splitter, e.g., optical splitter 130, FIG. 1. In step 806, second unmodulated signal 170 (Ch1') is transmitted to a multiplexer, e.g., hub optical multiplexer 128, FIG. 1. Referring back to step 804, first unmodulated signal 168 (Ch1) is split to function both as an LO for upstream detection, and as a seed for downstream data transmission. For upstream detection, step 804 proceeds to step 808, where first unmodulated signal 168 (Ch1) is received by an upstream receiver, i.e., upstream receiver 132, FIG. 1. For downstream data transmission, step 804 separately and simultaneously proceeds to step 810.

Step 810 is an optional step, where polarization division multiplexing is desired. In step 810, first unmodulated signal 168 (Ch1) is split into its x-component and y-component parts P1, P2, respectively (e.g., by PBS/PBC 304, FIG. 3 or PBS/PBC 504, FIG. 5) for separate direct or external modulation. Where polarization division multiplexing is not utilized, process 800 skips step 810, and instead proceeds directly from step 804 to step 812. In step 812, first unmodulated signal 168 (Ch1), or its polarized components if optional step 810 is implemented, is modulated by direct (e.g., FIGS. 2, 3, 5) or external (e.g., FIG. 4) modulation. Process 800 then proceeds from step 812 to step 814. Step 814 is an optional step, which is implemented if optional step 810 is also implemented for polarization division multiplexing. In step 814, the x-component and y-component parts P1, P2 are recombined (e.g., by PBS/PBC 304, FIG. 3 or PBS/PBC 504, FIG. 5) for output as downstream modulated data stream 172 (Ch1). Where polarization division multiplexing was not utilized, process 800 skips step 814, and instead proceeds directly from step 812 to step 816.

In step 816, second unmodulated signal 170 (Ch1') and downstream modulated data stream 172 (Ch1) are optically multiplexed, i.e., by hub optical multiplexer 128, FIG. 1, as a phase synchronized data stream pair (e.g., second data stream pair 702, FIG. 7). Process 800 then proceeds from step 816 to step 818, where the phase synchronized data stream pair is transmitted over an optical fiber, i.e., downstream fiber 108, FIG. 1. Process 800 then proceeds from step 818 to step 820, where the synchronized data stream pair is optically demultiplexed, e.g., by node optical demultiplexer 174 in fiber node 104. Process 800 then proceeds from step 820 to step 822, where both components of the demultiplexed data stream pair (e.g., second unmodulated signal 170 (Ch1') and downstream modulated data stream 172 (Ch1)) are received by a downstream receiver (e.g., downstream receiver 150, FIG. 1) for heterodyne coherent detection.

Where an end device (e.g., end device 106) further includes upstream transmission capability, process 800 further includes optional steps 824 and 826. In step 824, and prior to downstream reception in step 822, second unmodulated signal 170 (Ch1') is optically split (e.g., by end device optical splitter 158, FIG. 1), and additionally transmitted, in step 826, to an upstream transmitter of the end device (e.g., upstream transmitter 160, FIG. 1) as a seed signal for a modulator (e.g., modulator 164, FIG. 1) for upstream data transmission, as explained further below with respect to FIG. 9.

Figure 9:
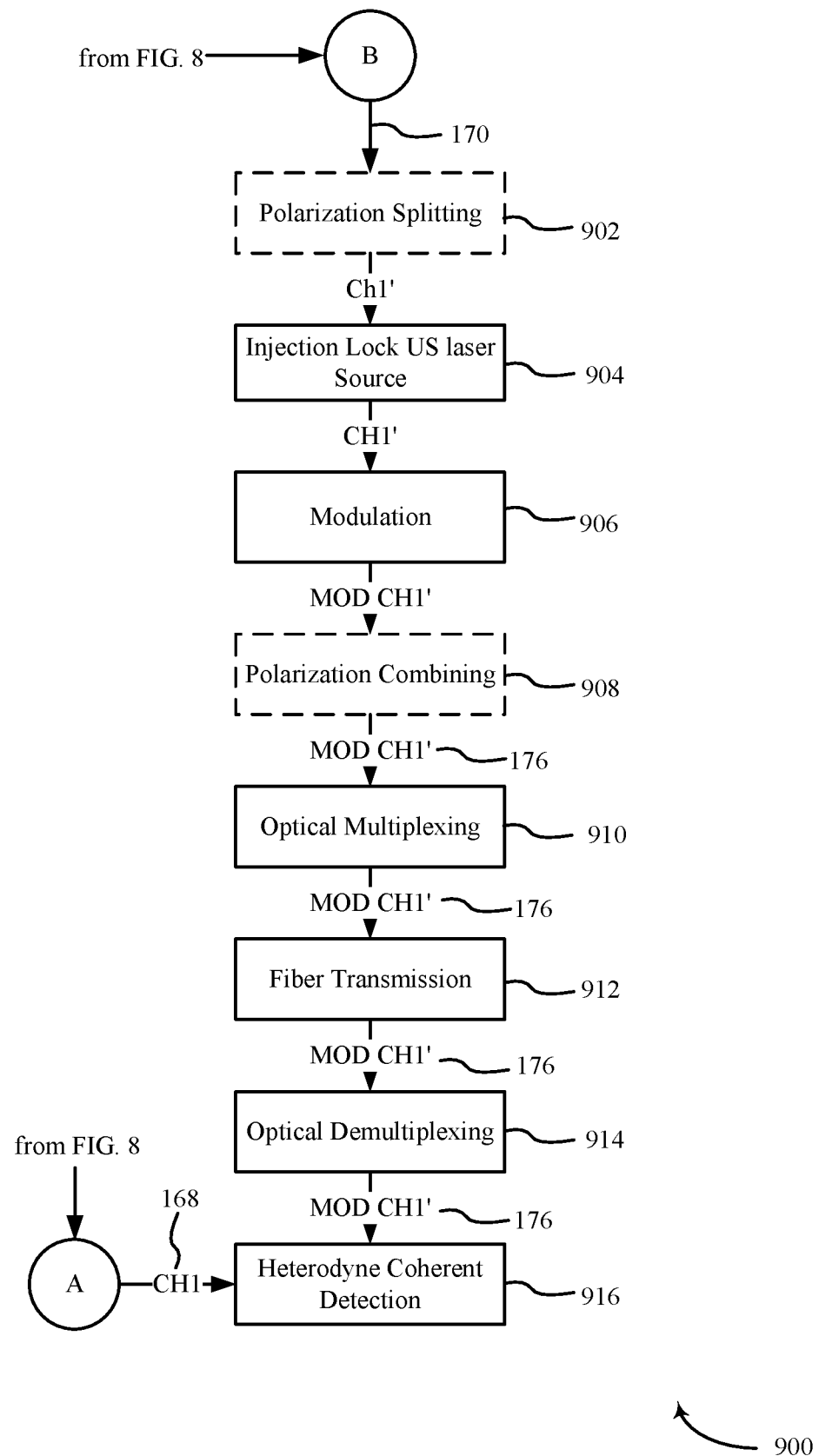
FIG. 9 is a flow chart diagram of an upstream optical network process that can be implemented with the downstream process depicted in FIG. 8.

FIG. 9 is a flow chart diagram of an upstream optical network process 900 that can be optionally implemented with fiber communication system 100, depicted in FIG. 1. Process 900 begins at optional step 902. In step 902, where polarization division multiplexing is utilized in the upstream transmitter (e.g., upstream transmitter 160, FIG. 1), second unmodulated signal 170 (Ch1') (from step 826, FIG. 8) is split into its x-component and y-component parts (e.g., by PBS/PBC 604, FIG. 6) for separate direct or external modulation. Where polarization division multiplexing is not utilized, step 902 is skipped, and process 900 instead begins at step 904.

In step 904, second unmodulated signal 170 (Ch1'), or its polarized components if optional step 902 is implemented, is injection locked to the master source laser (e.g., external laser 118, FIG. 1), as described above with respect to FIGS. 1 and 6. Step 904 then proceeds to step 906, where injection locked signal is modulated by direct or external modulation. Process 900 then proceeds from step 906 to step 908. Step 908 is an optional step, which is implemented if optional step 902 is also implemented for polarization division multiplexing. In step 908, the x-component and y-component parts of the excited Ch1' signal are recombined (e.g., by PBS/PBC 604, FIG. 6) for output as upstream modulated data stream 176 (Ch1'). Where polarization division multiplexing was not utilized, process 900 skips step 908, and instead proceeds directly from step 906 to step 910.

In step 910, upstream modulated data stream 176 (Ch1') is optically multiplexed, i.e., by node optical multiplexer 178, FIG. 1, with other upstream data stream signals (not shown). Process 900 then proceeds from step 910 to step 912, where upstream modulated data stream 176 (Ch1') is transmitted over an optical fiber, i.e., upstream fiber 110, FIG. 1. Process 900 then proceeds from step 912 to step 914, where upstream modulated data stream 176 (Ch1') is optically demultiplexed, e.g., by second hub optical demultiplexer 134, which separates the selected data stream from the other upstream data stream signals, for transmission to a particular upstream receiver tuned to receive the modulated data stream. Process 900 then proceeds from step 914 to step 916, where both components (e.g., first unmodulated signal 168 (Ch1), FIG. 8, and upstream modulated data stream 176 (Ch1')) of the upstream data stream pair, e.g., first data stream pair 700, FIG. 7, are received by an upstream receiver (e.g., upstream receiver and 32, FIG. 1) for heterodyne coherent detection.

Figure 10:
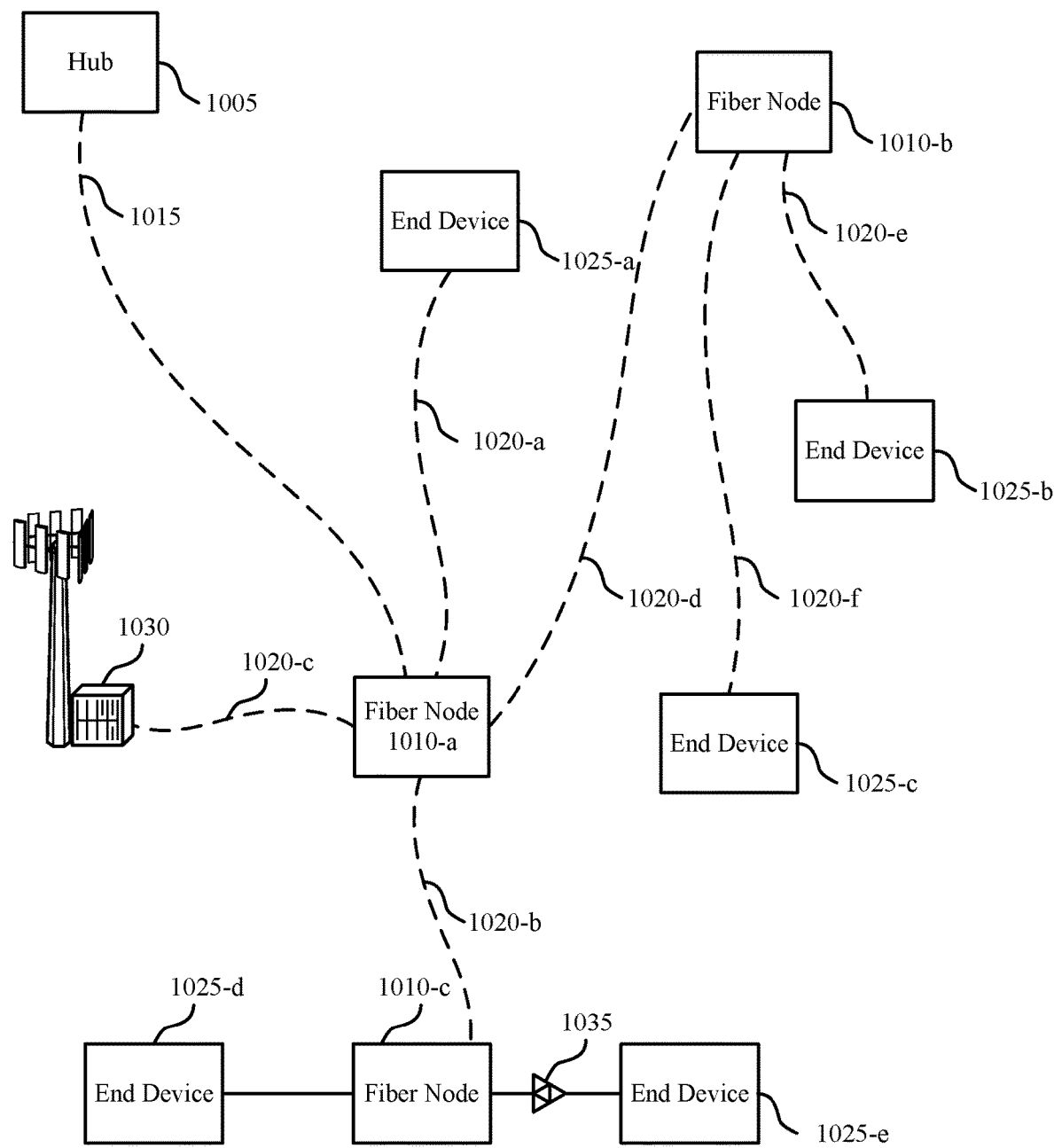
FIGS. 10-12 are schematic illustrations of fiber communication systems in accordance with aspects of the present disclosure.

FIG. 10 is a schematic illustration of a fiber communication system 1000 that supports network communication systems and methods in accordance with an embodiment of the present disclosure. System 1000 may include hub 1005, fiber nodes 1010, end devices 1025, and a base station 1030. Hub 1005 may be an optical hub 1005 that is, for example, a central office, a communications hub, or an optical line terminal (OLT). In the embodiment shown, fiber node 1010 is illustrated for use with an optical network, such as but not limited to a passive optical network (PON) and its variants. End devices 1025 may be downstream termination units, which can represent, for example, a customer device, customer premises (e.g., an apartment building), a business user, or an optical network unit (ONU). Base station 1030 is shown as a larger wireless station, such as a macro cell, but may equally, optionally or additionally include one or more small cells, micro cells, picocells, femtocell, and other versions of radio heads and remote radio heads including split and virtualized and particularly virtualized radio units. In an embodiment, system 1000 utilizes a coherent Dense Wavelength Division Multiplexing (DWDM) PON architecture. The fiber communication system 1000 may use aspects of fiber communication system 100 as described with reference to FIGS. 1 through 7. For example, the fiber node 1010 may include aspects of optical hub 102 and/or fiber node 104. In another example, end devices 1025 may include aspects of end devices 106.

Hub 1005 may communicate with fiber node 1010-*a* by way of optical fiber bundle 1015. Optical fiber bundle 1015 may be used to communicate both downstream communications to fiber node 1010-*a* and upstream communications from fiber node 1010-*a* to hub 1005. In operation, optical fiber bundle 1015 may be typically 30 km or shorter. However, according to the embodiments presented herein, greater lengths are contemplated, such as between 100 km and 1000 km. In some cases, optical fiber bundle 1015 may include only a single fiber or a few individual fibers (e.g., six). In an embodiment, fiber node 1010-*a* may connect with other devices by optical fibers 1020. For example, fiber node 1010-*a* may connect with end device 1025-*a* by optical fiber 1020-*a* and fiber nodes 1010-*b* and 1010-*c* by optical fibers 1020-*d* and 1020-*b* respectively. In some cases, fiber node 1010-*a* and end device 1025-*a* may be integrated as a single device, such as a modem, which may be located at or near a customer premises. In cases when the fiber node 1010-*a* and other devices (e.g., end device 1025-*a*, fiber nodes 1010-*b*, 1010-*c*, base station 1030) are separate devices, optical fibers 1020 may span distances of approximately 5000 feet or less, although this is not required. The system 1000 may correspond to an optical service domain group. The optical service domain group may correspond to a group of devices routing communications through fiber node 1010-*a*.

Fiber node 1010-*a* may be configured to multiplex and aggregate services over fiber access networks, such as but not limited to a cable access network and other access networks. For example, fiber node 1010-*a* may receive downstream communications and direct the downstream communications by optical fibers 1020 to one or more of the devices (e.g., end devices 1025, fiber nodes 1010, base station 1030). The downstream communications may carry DOCSIS channels, digital video, analog video channels, channels with telemetry information, set top box control channels, IP protocol data, over-the-top data, telephony channels, and any other data that may be carried over digital and analog networks. In another example, system 1000 may include EPON services, RFOG services, in combination with other services.

Fiber node 1010-*a* may receive and aggregate upstream communications from end device 1025-*a*, fiber nodes 1010-*b*, or base station 1030. The upstream communications may include DOCSIS channels, set top box return channels, upstream telemetry, and telephony channels. The upstream communications may also include EPON, Gigabit PON, RFOG, and Gigabit Ethernet. In some cases, the channels may be multiplexed, and a wideband composite signal may be used to intensity modulate an optical carrier (e.g., by an end device 1025). The fiber node 1010-*a* may combine the upstream signals and communicate them to hub 1005. Fiber node 1010-*a* may direct communications to other fiber nodes 1010. For example, the fiber node 1010-*a* may receive downstream communications from hub 1005 and direct the communications to other fiber nodes 1010 (e.g., fiber nodes 1010-*b* and 1010-*c*). Here, the receiving fiber nodes 1010-*b* and 1010-*c* may in turn receive the downstream communications from fiber node 1010-*a* and direct the communications accordingly. For example, fiber node 1010-*b* may receive downstream communications from fiber node 1010-*a* and direct the communications to end devices 1025-*b* and 1025-*c* by fibers 1020-*e* and 1020-*f*. Further, fiber node 1010-*b* may receive and aggregate upstream communications from end devices 1025-*b* and 1025-*c* and fiber node 1010-*b* may direct the upstream communications to fiber node 1010-*a*. In some examples, end devices 1025 may be homes, businesses, and so forth.

The system 1000 may be or include a hybrid fiber-coaxial (HFC) network. An HFC network may include both optical fibers 1020 and coaxial cables. In a case when system 1000 includes coaxial cables, fiber nodes 1010 may receive and direct communications by optical fibers and coaxial cables. For example, fiber node 1010-*c* may receive downstream communications from fiber node 1010-*a* by optical fiber 1020-*b* and direct the downstream communications by coaxial cables to end devices 1025-*d* and 1025-*e*. System 1000 may include one or more RF amplifiers 1035. The RF amplifiers 1035 may be used to amplify signals being communicated by a coaxial cable. For example, RF amplifier 1035 may be used to amplify a signal between fiber node 1010-*c* and end device 1025-*e*. In some cases, a number or placement of RF amplifiers 1035 may be based on a number of factors such as a length of coaxial cable, a type of signal being communicated on the coaxial cable, or an amount of noise associated with the signals being communicated on the coaxial cable.

Fiber node 1010-*a* may be configured to direct communications for multiple industries. That is, fiber node 1010-*a* may direct optical communications as well as wireless communications. For example, system 1000 may be used for point-to-point optical link based services, such as Gigabit Ethernet (e.g., used to support business services). In another example, fiber node 1010-*a* may connect base station 1030 to a backhaul network (e.g., establish a wired communication between the base station 1030 and the hub 1005) by optical fiber 1020-*c*. Alternatively, fiber node 1010-*a* may connect base station 1030 to a fronthaul, mid-haul or x-haul network, depending on the network configuration and/or coupling. Base station 1030 has been included for explanatory purposes only and system 1000 may include one or more base stations 1030 or no base stations. In some cases, the system 100 may include one or more access points or other types of radio units.

The system 1000 may enable multiple transmissions (e.g., downstream transmissions to one or more end devices 1025, upstream transmissions from one or more end devices) at the same time. For example, system 1000 may be, but not limited to, an RFOG system. Certain types of RFOG systems may enable simultaneous upstream transmissions. Here, multiple simultaneous transmissions may be allowed in synchronous code division multiple access (S-CDMA) mode and also in DOCSIS 3.0 mode. That is, there may be a first transmission (e.g., by a first device such as an end device 1025, fiber node 1010, or base station 1030) on a first channel at the same time that another device transmits on other channels. Additionally, or alternatively, system 1000 may enable transmissions corresponding to different services or optical networks (e.g., PON, RFOG, EPON, Gigabit PON, SPON, AON, etc.).

Simultaneous transmissions and transmissions from different services may result in OBI. For example, if two devices transmit using wavelengths close enough in frequency such that their difference falls within the frequency response of the optical receiver, their transmissions may cause OBI. Different techniques may be used to eliminate, minimize and/or control OBI.

System 1000 may ensure that upstream transmissions are maintained according to certain wavelength windows. For example, fiber node 1010-*a* may provide more than one seed source (e.g., narrow wavelength bands) and transmit the seed sources to end devices 1025, fiber nodes 1010, and base station 1030. The seed sources may be maintained within constraints of wavelength filter windows (e.g., fiber node 1010-*a* may provide wavelength bands in order to avoid or minimize OBI). The fiber node 1010-*a* may transmit a seed source with a unique wavelength band to each of the devices (e.g., end devices 1025, fiber nodes 1010, and base station 1030). The devices may provide upstream communications according to the received wavelength band, thus minimizing OBI resulting in simultaneous upstream communications from the devices or communications by different services.

By placing the seed sources at the fiber node (e.g., closer to the end devices 1025 when compared to placing the seed sources at the hub 1005), the seed signals may be stronger for injection locking at the end devices 1025. This may reduce a complexity of the seed sources.

Figure 11:
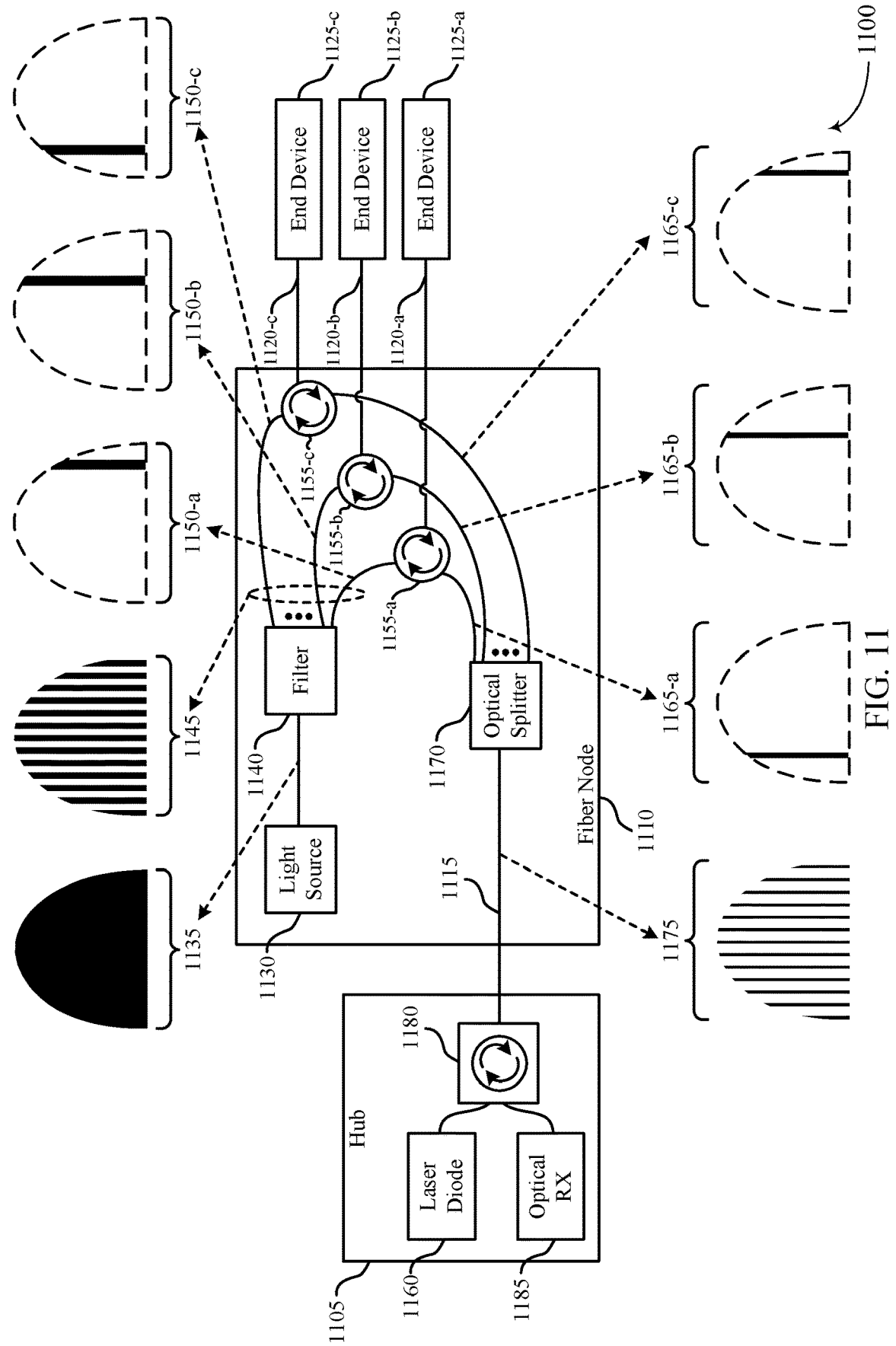

FIG. 11 is a schematic illustration of a communication system 1100 that supports network communication systems and methods in accordance with an embodiment of the present disclosure. The system 1100 may include one or more components as described with reference to FIGS. 1-7 and 10. For example, the system 1100 may include a hub 1105 in communication with a fiber node 1110. The hub 1105 and fiber node 1110 may be example of hub 1005 and fiber nodes 1010 as described with reference to FIG. 10. Further, the system 1100 may include end devices 1125 which may be examples of end devices 1025 as described with reference to FIG. 10. The end devices 1125 may be downstream termination units, base stations (e.g., such as base station 1030 as described with reference to FIG. 10), or other fiber nodes 1110. System 1100 may be a passive optical network (PON) and, in some cases, may reduce (e.g., eliminate) OBI.

In operation, fiber node 1110 may perform the same general functions as fiber node 1010-*a* as described with reference to FIG. 10. Fiber node 1110 may direct downstream communications from hub 1105 to end devices 1125 and upstream communications from end devices 1125 to the hub 1105. System 1100 may detail the components and data flow for upstream communications. Fiber node 1110 may aggregate the upstream communications by optical splitter 1170, which may output an aggregated upstream communication (e.g., a single upstream communication including the upstream communications from end device 1125-*a*, 1125-*b*, and 1125-*c*). The number of ports of the optical splitter 1170 may define the size of the optical service domain group. The optical splitter 1170 may achieve low loss (e.g., when compared to a fused fiber coupler). In some cases, the combining loss (e.g., a loss of power when aggregating multiple upstream transmissions) using the optical splitter 1170 may be lower (e.g., when compared to a combining loss using a fused fiber coupler) when the number of upstream transmissions is high. Alternatively, a wavelength multiplexer may be used instead of the optical splitter 1170 which may result in lower losses when a number of ports is high. Fiber node 1110 may facilitate the transmission of the aggregated upstream communication via optical fiber 1115 to hub 1105.

The hub 1105 receives the aggregated upstream communications by the integrated splitter and circulator 1180. At the hub 1105, the aggregate upstream wavelengths may be received by a same optical receiver (e.g., as optical splitter 1170) since the sensitivity of semiconductor photodetectors cover a very wide wavelength range. For example, InGaAs photodiodes may receive optical signals between approximately 900 nm and 1670 nm. Integrated splitter and circulator 1180 demultiplex the upstream communications (e.g., the splitter or the alternative wavelength multiplexer may filter upstream communications by wavelength) and direct the upstream communications to the optical receivers 1185. The optical receivers 1185 may be, for example, photodetectors.

The light source 1130 of the fiber node 1110 participates in the generation of a unique seed source 1150 for each end device 1125. As previously discussed, a comb generator may also be used to generate a seed source for each end device. In FIG. 11, in order to provide the unique seed sources 1150, the fiber node may filter a broad band signal 1135 to obtain more than one narrower bandwidth signals where each of the narrower bandwidth signals correspond to a unique seed source 1150. The light source 1130 may generate the broadband signal 1135. The light source 1130 may be, for example, a super-luminescent light emitting diode (S-LED), an optical amplifier, a light emitting diode (LED) coupled with an optical amplifier, any appropriate light source that generates a broadband signal, or any combination thereof. The broadband signal 1135 may span a large wavelength range. For example, the broadband signal 1135 may generally span 100s of nanometers. For example, the broadband signal 1135 may span approximately 800 nm to 900 nm, 1250 nm to 1350 nm, or 1500 nm to 1600 nm. In some other cases, the broadband signal 1135 may span wavelengths greater than 1600 nm and/or less than 800 nm.

Filter 1140 may collect the broadband signal 1135 from the light source 1130 and filter the broadband signal 1135 to provide the unique seed sources 1150. The filter 1140 may be a wavelength division multiplexing (WDM) filter. For example, the filter 1140 may be an arrayed waveguide grating filter, a thin film filter or any other appropriate filter or combination thereof. The filter 1140 may output a plurality of signals 1145 that correspond to narrow wavelength slices of the broadband signal 1135. The gain curve of broadband signal 1135 (e.g., a shape of broadband signal 1135 corresponding to a power for the wavelengths included within broadband signal 1135) and the plurality of signals 1145 may be similar. The plurality of signals 1145 includes a summation of each of the individual seed sources 1150 being output from filter 1140. The number of seed sources generated by filter 1140 may correspond to a number of end devices 1125 (e.g., a size of the optical service domain group). In some cases, service groups of 40 would match wavelength filter sizes designed for DWDM C-band. Nevertheless, different granularity of wavelength filters and number of ports may be used. Multiple of these 40 port subscriber units can be used in parallel depending on the total number of subscribers served through the optical node.

Each of the seed sources 1150 may include a signal of a narrower bandwidth (e.g., when compared to a bandwidth of the broadband signal 1135). For example, each seed source 1150 may span between 50 gigahertz (GHz) and 100 GHz. In some cases, the center frequency of each of the seed sources 1150 may be offset by 100 GHz. For example, if a first seed source 1150-*a* has a center frequency of 191,000 GHz, a neighboring seed source 1150 (e.g., a seed source corresponding to a next-highest or next-lowest center frequency) may have a center frequency of 191,100 GHz. Other center frequencies may be appropriate such as approximately 350,000 GHz, with a neighboring seed source with a center frequency of 350,100 GHz. The seed sources 1150 may be directed to a corresponding optical circulator 1155. The circulator may then direct the seed source to a corresponding end device 1125. For example, optical circulator 1155-*a* may direct seed source 1150-*a* to end device 1125-*a* by optical fiber 1120-*a*. Similarly, optical circulators 1155-*b* and 1155-*c* may route seed sources 1150-*b* and 1150-*c* to end devices 1125-*b* and 1125-*c* respectively.

The seed sources 1150 may be used for injection locking at the end devices 1125. Each end device 1125 may include an upstream laser diode. In some cases, each end device 1125 may include a generic laser diode. A generic laser diode may include a non-wavelength specific laser diode (e.g., end device 1125-*b* may include a similar laser diode to end device 1125-*c*). A non-wavelength specific laser diode may be a laser diode with multi-longitudinal modes that enables injection locking on one of its longitudinal modes overlapping in frequency or in close frequency proximity of the seed source. In some examples, the end devices may support DWDM but may not use wavelength specific structures. The laser diodes at the end devices 1125 may be referred to as slave laser sources. The seed sources 1150 may function as a substantially-narrow band or single longitudinal mode master to keep the frequency of a resonator mode of the laser diode at the end devices 1125 close enough to the frequency of the seed source 1150. The end devices 1125 may be configured to receive a seed source 1150 input and output a data stream including primarily a bandwidth corresponding to the seed source 1150. By injection locking the laser diodes at the end devices 1125, the system 1100 may eliminate (or substantially decrease) OBI within the system. That is, the end devices 1125 may use a conventional simple cavity (e.g., Fabry Perot) laser diode which, through the filtered wavelength window controlling the seed source injection locking, generate a wavelength that is separated by large frequency gaps from any other laser diode (and corresponding end device 1125) in the optical service domain group. These frequency gaps are large enough such that no optical beats (mixing products) fall within the frequency response of the fiber node 1110.

End devices 1125 may modulate the signals from their respective laser diodes (e.g., that include primarily the wavelengths corresponding to their associated seed source) with data and communicate upstream transmissions to the fiber node 1110. Modulating the signal at end devices 1125 will be discussed in further detail herein. Signals 1165-*a*, 1165-*b*, and 1165-*c* may correspond in frequency to the seed sources 1150-*a*, 1150-*b* and 1150-*c* respectively. Thus, the filter 1140 may provide seed sources that may be within certain filtered wavelength windows and the corresponding upstream transmissions (e.g., generated at the end devices 1125) may also be substantially within the filtered wavelength windows and therefore may not cause OBI. The signals 1165 may be received at an optical circulator 1155 and directed to the optical splitter 1170. Signal 1175 illustrates the output from the optical splitter 1170. Specifically, each of the signals from the end devices 1125 may be aggregated such that signal 1175 is directed to the hub 1105.

Figure 12:
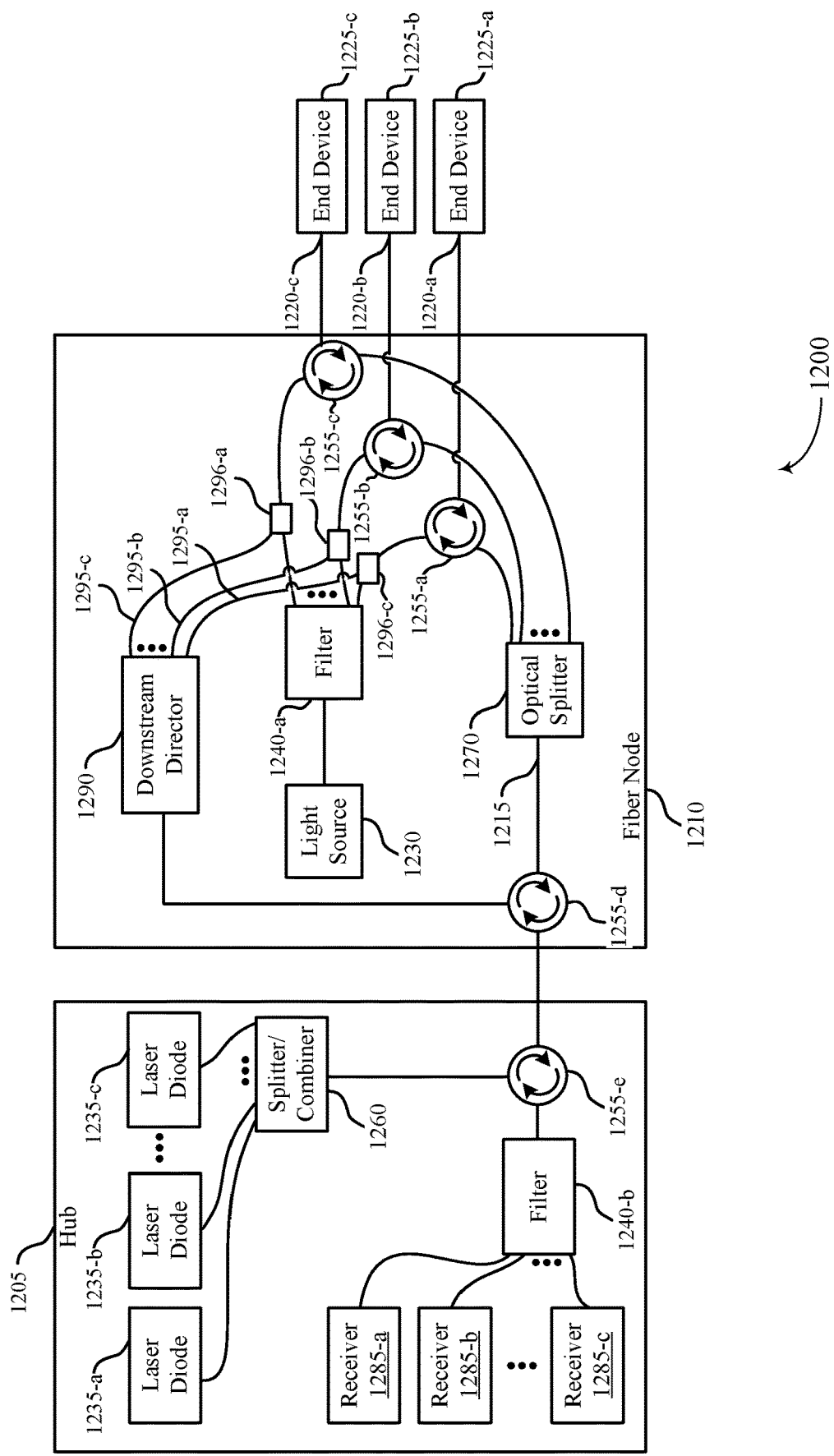

FIG. 12 is a schematic illustration of a fiber communication system 1200 that supports network communication systems and methods in accordance with an embodiment of the present disclosure. The system 1200 may include one or more components as described with reference to FIGS. 10 and 11. For example, the system 1200 may include a hub 1205 in communication with a fiber node 1210. The hub 1205 and fiber node 1210 may be example of hubs 1005 and 1105 and fiber nodes 1010 and 1110 as described with reference to FIGS. 10 and 11, respectively. Further, the system 1200 may include end devices 1225 which may be examples of end devices 1025 and 1125 as described with reference to FIGS. 10 and 11. The end devices 1225 may be user devices which may be capable of having upstream and downstream capabilities, base stations (e.g., such as base station 1030 as described with reference to FIG. 10), or other fiber nodes 1210. System 1200 may be a PON and, in some cases, may reduce and/or eliminate OBI.

In operation, fiber node 1210 may perform the same general functions as fiber node 1010-*a* as described with reference to FIG. 10 and fiber node 1110 as described with reference to FIG. 11. Fiber node 1210 may direct downstream communications from hub 1205 to end devices 1225 and upstream communications from end devices 1225 to the hub 1205. Fiber node 1210 may collect downstream communications from hub 1205. Hub 1205 may direct downstream communications by laser diodes 1235. The downstream communications generated by laser diodes 1235 at the hub 1205 may each correspond to a single end device in the case of a point to point communication (e.g., laser diode 1235-*a* may generate downstream communications for end device 1225-*a*) or correspond to multiple end devices in the case of point to multi-point communication. The downstream communications may be collected by the optical splitter and combiner 1260. The optical splitter and combiner may aggregate the downstream communications and direct the aggregated downstream communication to optical circulator 1255-*e*. The optical circulator 1255-*e* may direct the aggregated downstream communication to the fiber node 1210.

The optical circulator 1255-*d* at the fiber node 1210 may direct the aggregated downstream communication to downstream director 1290. The downstream director 1290 may be an optical splitter, or a wavelength multiplexer, or a wavelength switch or a combination thereof. In some examples, the downstream director 1290 may be an optical splitter, and the downstream director 1290 may direct the aggregated downstream communication to each of the end devices 1225. If the downstream director 1290 is an optical splitter, the downstream traffic 1295-*a*, 1295-*b*, and 1295-*c* may include the same aggregated downstream communication each including a same broad wavelength establishing point to multi-point communications. In some examples, the downstream director 1290 may be a wavelength switch, and the downstream director 1290 may filter the aggregated downstream signal and output unique downstream signals to each end device 1225 establishing point to point communications. Here, optical signals carrying downstream traffic 1295-*a*, 1295-*b*, and 1295-*c* may include different wavelengths (e.g., specific to the end device 1225).

For upstream communications, the fiber node 1210 may provide a unique seed source for each end device 1225. As discussed with reference to FIG. 11, the light source 1230 may generate a broadband signal and the filter 1240-*a* may output a plurality of seed sources that correspond to narrow wavelength slices of the broadband signal. In some cases, the light source 1230 and the filter 1240-*a* may include a coherent light source. Coherent light sources and the corresponding systems and devices may be further discussed in U.S. patent application Ser. No. 15/283,632, which is herein incorporated by reference in its entirety. In some cases, the light source 1230 and the filter 1240-*a* may be replaced by multiple coherent light sources, which may each generate a unique coherent seed source intended for each end device 1225. In some other cases, the light source 1230 may include multiple coherent light sources which may each generate different wavelengths of light, such that the light source 1230 may generate more than one band of coherent light. The filter 1240-*a* may be configured to separate the bands of coherent light into individual seed sources. The seed sources and the optical signal with downstream data 1295 may be aggregated using an optical coupler 1296 (or an optical combiner 1296) prior to being directed to an optical circulator 1255. The optical circulator 1255 may direct the seed source and downstream data to a corresponding end device 1225. The end devices may collect the seed source and the downstream data.

The seed sources may be used for injection locking at the end devices 1225. The end devices 1225 may be configured to collect a seed source input and output a data stream including primarily a bandwidth corresponding to the seed source. By injection locking the laser diodes at the end devices 1225, the system 1200 may avoid (or substantially decrease) OBI within the system. End devices 1225 may modulate the signals at their respective laser diodes (e.g., that include primarily the wavelengths corresponding to their associated seed source) with data and communicate upstream transmissions to the fiber node 1210. In some examples, the end devices 1225 may use external intensity modulation and/or coherent modulation to output the data stream. Thus, the filter 1240-*a* may provide seed sources that exist within certain filtered wavelength windows and the corresponding upstream transmissions (e.g., generated at the end devices 1225) may also exist within the non-overlapping filtered wavelength windows and therefore do not cause OBI.

Fiber node 1210 may collect upstream communications from end devices 1225 (e.g., by optical fibers 1220). Optical circulators 1255 may direct the upstream communications to the optical splitter 1270. The optical splitter 1270 may aggregate the upstream communications. In some cases, the optical splitter 1270 may instead be a wavelength multiplexer Fiber node 1210 may direct the aggregated upstream communication by optical fiber 1215 to hub 1205 (e.g., through optical circulator 1255-*d*). The optical circulator 1255-*e* may collect the aggregated upstream communication and direct the aggregated upstream communication to the filter 1240-*b*. Filter 1240-*b* may filter the aggregated upstream communication (e.g., based on wavelength) and direct the filtered upstream communications to receivers 1285. Each receiver 1285 may collect upstream communication from a single end device 1225. For example, receiver 1285-*a* may collect upstream communications from end device 1225-*a*. Here, receiver 1285-*a* may collect a filtered upstream communication corresponding to a wavelength range similar to the seed source collected by end device 1225-*a*. Alternatively, receivers 1285 may collect filtered upstream communications from multiple end devices 1225.

Figure 13A:
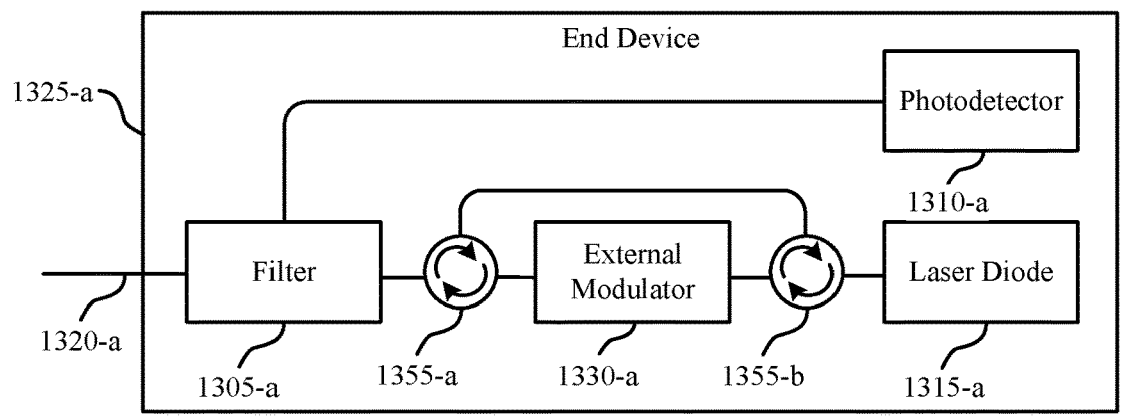
FIGS. 13A-13C are schematic illustrations of fiber communication systems in accordance with aspects of the present disclosure.

FIG. 13A is a schematic illustration of a fiber communications system 1300-*a* that supports network communication systems and methods in accordance with an embodiment of the present disclosure. The fiber communication systems 1300-*a* may include one or more components as described with reference to FIGS. 10 through 12. For example, the end device 1325-*a* may be an example of end devices 1025, 1125, and 1225 as described with reference to FIGS. 10 through 12. End device 1325-*a* may include a filter 1305-*a*, optical circulators 1355-*a* and 1355-*b*, a photodetector 1310-*a*, a laser diode 1315-*a*, and an external modulator 1330-*a*.

In some examples, the end device 1325-*a* may include components which may be integrated together (e.g., integrated within a same end device 1325-*a*) by employing compatible materials for each of the components. In some examples, the laser diode 1315-*a* may be an indium phosphide laser diode and the optical circulators 1355-*a* and 1355-*b* may additionally be based on indium phosphide. In some cases, the indium phosphide laser diode 1315-*a* may be integrated together with the external modulator 1330-*a* by employing compatible materials which may be based on the corresponding material band gaps. In some examples, the indium phosphide laser diode 1315-*a* may be integrated with an indium phosphide Mach-Zehnder external modulator 1330-*a* and, the photodetector 1310-*a* may be an indium gallium arsenide phosphide photodetector.

End device 1325-*a* may be in communication with a fiber node (not illustrated in FIG. 13A) by optical fiber 1320-*a*. The end device 1305-*a* may collect communications at filter 1305-*a*. The filter 1305-*a* may be a waveguide grating filter. In some cases, the filter 1305-*a* may be a static filter. For example, the filter 1305-*a* may be statically configured to select and direct signals of certain wavelengths. In other cases, the filter 1305-*b* may be an active filter and the selected wavelength ranges and/or resulting direction may be configurable. In FIG. 13A, filter 1305-*a* may be configured to separate and direct downstream communications to the photodetector 1310-*a*. The downstream communications may include a broad wavelength range (e.g., directed to more than one end device 1325), and the filter 1305-*a* may select a wavelength range of the downstream communication specific to the end device 1325-*a* and direct this wavelength range to the photodetector.

Additionally, in FIG. 13A, the filter 1305-*a* may collect communications via optical fiber 1320-*a* and separate a seed source from the collected communications. The seed source may be directed by the filter 1305-*a* (e.g., the seed source originating from a fiber node and collected at the end device) to the optical circulator 1355-*a*. The seed source may be a signal spanning primarily a wavelength range. In some cases, the seed source may be generated by a broad spectrum light source. Alternatively, the seed source may be a coherent signal. Coherent signals will be discussed in further detail herein.

The optical circulator 1355-*a* may direct the seed source to the second optical circulator 1355-*b*. The second optical circulator 1355-*b* may be in two-way communication with the laser diode 1315-*a*. Therefore, the second optical circulator 1355-*b* may direct the seed source upstream and into the laser diode 1315-*a* and may direct a signal (e.g., generated by the laser diode 1315-*a*) from the laser diode 1315-*a* downstream to the external modulator 1330-*a* and may direct the seed source signal coming from the first circulator to the second circulator to the laser diode.

Laser diode 1315-*a* may be designed with a cavity length such that at least one longitudinal mode may correspond to one filtered wavelength window or one tone generated by a comb generator (e.g., 40 or 80 modes or tones). Each mode may correspond to the wavelength range of a signal output by the laser diode 1315-*a*. For example, in a first mode the laser diode 1315-*a* may collect a seed source corresponding to a first wavelength range. Here, the laser diode 1315-*a* may output a signal including primarily the first wavelength range. In a second mode, the laser diode 1315-*a* may collect a seed source corresponding to a second wavelength range (e.g., that is different than the first wavelength range). In this example, the laser diode 1315-*a* may output a different signal (e.g., when compared to the first mode) including primarily the second wavelength range. The separation between cavity modes may range from tens of GHz to hundreds of GHz.

In some examples, the laser diode 1315-*a* may be driven by a specific constant current that results in laser diode 1315-*a* and seed source wavelength spectrum overlap and an injection locked condition. Changing a current supply of the laser diode 1315-*a* at faster rates may result in the laser diode 1315-*a* and the seed source losing the locking condition. Maintaining the laser diode 1315-*a* at a specific stable operating current condition that tracks in frequency to the seed source emissions may result in reliable injection locked operation. in similar changes to the resulting wavelength. Because the laser diode 1315-*a* may not be modulated at high frequencies (e.g., the current driving laser diode 1315-*a* is constant), the laser diode 1315-*a* may operate in a mode based on the wavelength range of the seed source rather than the current.

The laser diode 1315-*a* may include two facets (e.g., a front facet and a rear facet) or reflective surfaces at each end of the cavity of the laser diode 1315-*a*. The reflectivity of the laser diode 1315-*a* may be controlled to increase an amount of energy that can be input or output from the cavity. The optical circulator 1355-b may direct the seed source into a front facet of the laser diode 1315-a. The front facet reflectivity and the length of the laser cavity may be used to regulate the amount of energy directed into and out of the cavity. The seed source may be used to injection lock a signal being output from the laser diode 1315-a. Thus, the signal being directed from the laser diode 1315-a to the optical circulator 1355-b may be associated with the same wavelength as the collected seed source.

The external modulator 1330-a may intensity-modulate the signal generated by the laser diode 1315-a. By intensity modulating the signal generated by the laser diode 1315-a, the external modulator 1330-a may provide a modulated signal and/or encode a signal with information and corresponding to an upstream communication. Externally modulating the signal generated by the laser diode 1315-a may allow the laser diode 1315-a to be stable (e.g., driven at the constant current).

In some examples, the seed source may be generated by a broad spectrum light source, and the external modulator 1330-a may provide a single data stream via amplitude or intensity modulation. In some examples, the seed source may be generated by a coherent light source, and the external modulator 1330-a may implement amplitude and phase modulation (e.g., coherent modulation). In some examples, the external modulator 1330-a may be an in-phase quadrature modulator. Continuing the example, the external modulator 1330-a may encode up to four data streams into one optical signal for concurrent upstream communications. Two streams encoded in each polarization and each polarization encoded with an in-phase stream and a quadrature stream (e.g., 90° out of phase). The external modulator 1330-a may include four different modulators each configured to collect a signal from the laser diode 1315-a and further configured to output a phase modulated signal to the optical circulator 1355-a. The external modulator 1330-a may utilize one or more phase shift elements and one or more polarization beam splitters to provide four upstream data streams for concurrent communication. External modulation with coherent light sources will be discussed in further detail herein.

In some examples, the external modulator 1330-a may direct the upstream modulated signal (or signals in the case of coherent modulation) to the optical circulator 1355-a. The optical circulator 1355-a may direct the modulated signal to the filter 1305-a. The optical circulator 1355-a may keep the modulated signal (e.g., the upstream communication) separate from the downstream communications. That is, the optical circulator 1355-a may direct the seed source downstream to the optical circulator 1355-b to prevent the downstream communications (e.g., broadband energy) from traversing to the external modulator 1330-a.

The filter 1305-a may direct the upstream communications (e.g., the modulated signal), by optical fiber 1320-a, to the fiber node. The upstream communications may primarily include the wavelength range of the seed source. By controlling the wavelength range of the upstream communications, the end device 1325-a may provide upstream communications that eliminate OBI (and/or significantly decrease OBI).

Figure 13B:
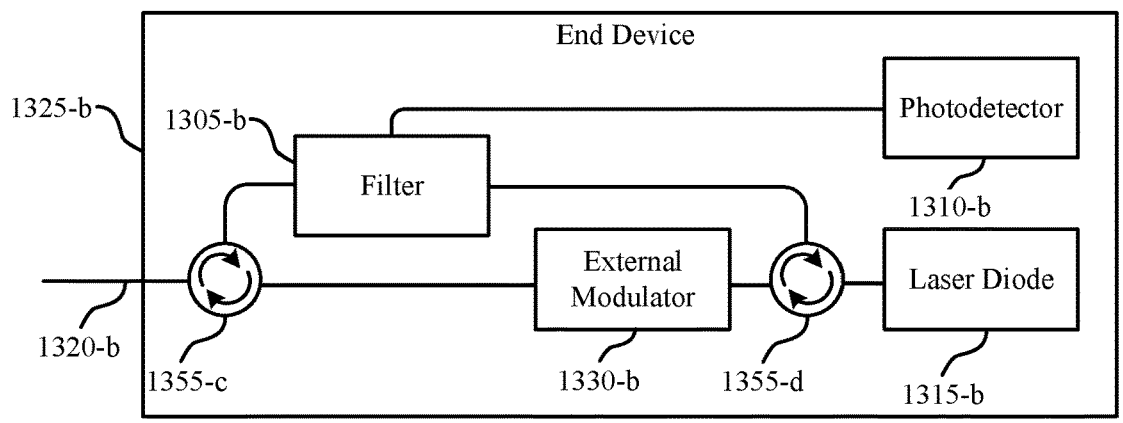

FIG. 13B is a schematic illustration of a fiber communications system 1300-b that supports network communication systems and methods in accordance with an embodiment of the present disclosure. The fiber communications system 1300-b may include one or more components as described with reference to FIGS. 10 through 13A. For example, the end device 1325-b may be an example of end devices 1025, 1125, and 1225 as described with reference to FIGS. 10 through 12. In some cases, end device 1325-b may include aspects of end device 1325-a. For example, filter 1305-b, optical circulators 1355-c and 1355-d, photodetector 1310-b, laser diode 1315-b, and external modulator 1330-b may be examples of the corresponding components in end device 1325-a.

End device 1325-b may be in communication with a fiber node (not illustrated in FIG. 13B) by optical fiber 1320-b. The end device 1325-b may be another example configuration of an end device (e.g., in addition to end device 1325-a). Specifically, end device 1325-b may demonstrate an alternative location of filter 1305-b. As illustrated in FIG. 13A, filter 1305-a may collect downstream communications and a seed source. Alternatively, and as illustrated in FIG. 13B, the optical circulator 1355-c may collect and direct the downstream communications and the seed source to the filter 1305-b. In some cases, the filter 1305-a may introduce reflection (e.g., towards the fiber node by optical cable 1320-a). By placing the filter between optical circulators 1355, the end device 1325-b may reduce this undesirable reflection.

The filter 1305-b may separate and direct downstream communications to the photodetector 1310-b. The filter 1305-b may further separate and direct a seed source (e.g., from a fiber node) to the optical circulator 1355-d. The optical circulator 1355-d may be in two-way communication with the laser diode 1315-b. Therefore, the optical circulator 1355-d may direct the seed source to the laser diode 1315-b and direct a signal generated by the laser diode 1315-b and from the laser diode 1315-b to the external modulator 1330-b. The optical circulator 1355-d may direct the seed source into a front facet of the laser diode 1315-b. The seed source may be used to injection lock the laser diode 1310-b to generate a signal. Thus, the signal being directed from the laser diode 1310-b to the optical circulator 1355-d may be associated with the same wavelength as the seed source.

The external modulator 1330-b may intensity modulate the signal generated by the laser diode 1315-b. By intensity modulating the signal generated by the laser diode 1315-b, the external modulator 1330-b may provide a signal and/or encode information on the signal which may correspond to an upstream communication. The external modulator 1330-b may direct the upstream communication to the optical circulator 1355-c. The optical circulator 1355-c may in turn direct the upstream communication, by optical fiber 1320-b, to the fiber node. The upstream communications may be a modulated signal encoded with information and may primarily include the wavelength range of the seed source. By controlling the wavelength range of the upstream communications, the end device 1325-b may provide upstream communications that eliminate OBI (or significantly decrease OBI).

Figure 13C:
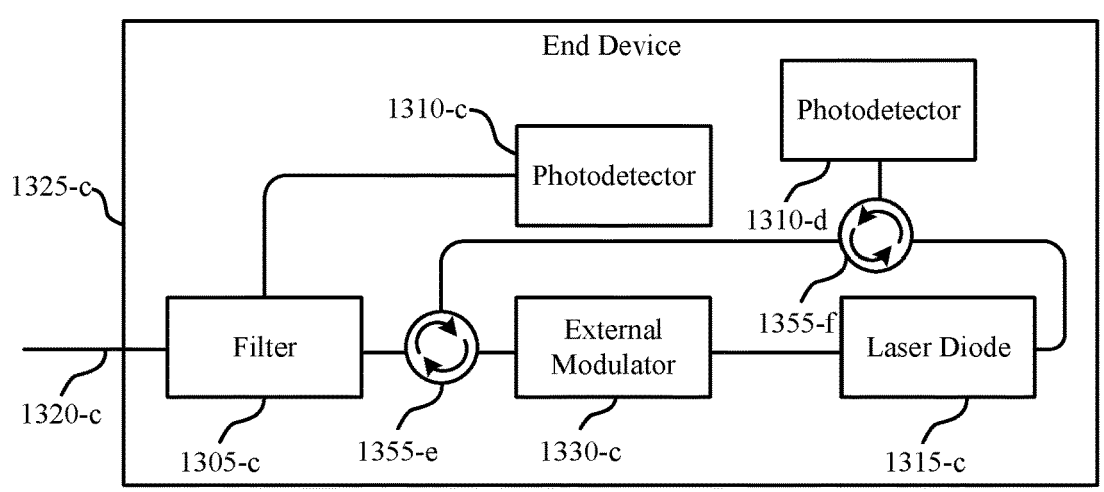

FIG. 13C is a schematic illustration of a fiber communications system 1300-c that supports network communication systems and methods in accordance with an embodiment of the present disclosure. The fiber communications system 1300-c may include one or more components as described with reference to FIGS. 10 through 13B. For example, the end device 1325-c may be an example of end devices 1025, 1125, and 1225 as described with reference to FIGS. 10 through 12. In some cases, end device 1325-c may include aspects of end devices 1325-a or 1325-b. For example, filter 1305-c, optical circulators 1355-e and 1355-f, photodetectors 1310-c and 1310-d, laser diode 1315-c, and external modulator 1330-*c* may be examples of the corresponding components in end device 1325-*a*.

The end device 1325-*c* may be another example configuration of an end device (e.g., in addition to end devices 1325-*a* and 1325-*b*). Specifically, end device 1325-*c* may demonstrate stimulating the laser diode 1315-*c* by rear-facet injection.

End device 1325-*c* may be in communication with a fiber node (not illustrated in FIG. 13*c*) by optical fiber 1320-*c*. Filter 1305-*c* may be configured to separate and direct downstream communications to the photodetector 1310-*c*. The filter 1305-*c* may further separate and direct a seed source (e.g., from a fiber node) to the optical circulator 1355-*e*. The optical circulator 1355-*e* may direct the seed source to the second optical circulator 1355-*f*. The second optical circulator 1355-*f* may be in one-way communication with photodetector 1310-*d* and two-way communication with the laser diode 1315-*c*.

The second optical circulator 1355-*f* may direct the seed source to the rear facet of the laser diode 1315-*c*. The rear facet of the laser diode 1315-*b* may direct and/or reflect the signal from the laser diode 1315-*b* to the optical circulator 1355-*f*. Thus, the signal may be the reflected signal from the rear facet of laser diode 1315-*c*. In some cases, the signal may include a signal emitted from the rear facet of the laser diode 1315-*c*. The optical circulator 1355-*f* may direct the reflected/emitted signal to photodetector 1310-*d*. The photodetector 1310-*d* may determine a status and/or health of the light sources and/or laser diodes located at the end device, based on the signal detected at the photodetector monitor 1310-*d* and from the laser diode 1315-*c*. For example, the photodetector monitor 1310-*d* may detect a wavelength composition of the signal and/or an energy of the signal, or may determine an expected energy of the signal. If the detected energy of the signal is different than the expected energy of the signal, the photodetector 1310-*d* may determine that the light sources of the end device may not be operating as expected.

The seed source may be used to injection lock a signal being output from the laser diode 1315-*c*. Thus, the laser diode 1315-*c* may generate a signal associated with approximately the same wavelength as the seed source. Because some of the signal may be lost (e.g., by reflection at the rear facet of the laser diode 1315-*c*), the gain of the laser diode 1315-*c* in this configuration may be lower than in other configurations. For example, the laser diode 1315-*c* may have a gain of 40 when using front facet injection. However, when using the rear facet injection, the laser diode 1315-*c* gain may be in the approximate range of 10 to 40 (e.g., depending on the energy of the signal reflected at the rear facet of the laser diode 1315-*c* to the photodetector 1355-*d*). The laser diode 1315-*c* may direct the generated signal (e.g., the injection-locked signal) from a front facet to the external modulator 1330-*c*.

The external modulator 1330-*c* may intensity modulate the signal generated by the laser diode 1315-*c*. By intensity modulating the signal generated by the laser diode 1315-*c*, the external modulator 1330-*c* may provide a modulated signal and/or encode information on a signal, corresponding to an upstream communication. The external modulator 1330-*c* may direct the upstream communication to the optical circulator 1355-*e* which may direct the upstream communication to the filter 1305-*c*. The filter 1305-*c* may in turn direct the upstream communication, by optical fiber 1320-*c*, to the fiber node. The upstream communications may primarily include the wavelength range of the seed source. By controlling the wavelength range of the upstream communications, the end device 1325-*c* may provide upstream communications that eliminate OBI (or significantly decrease OBI).

Figure 14A:
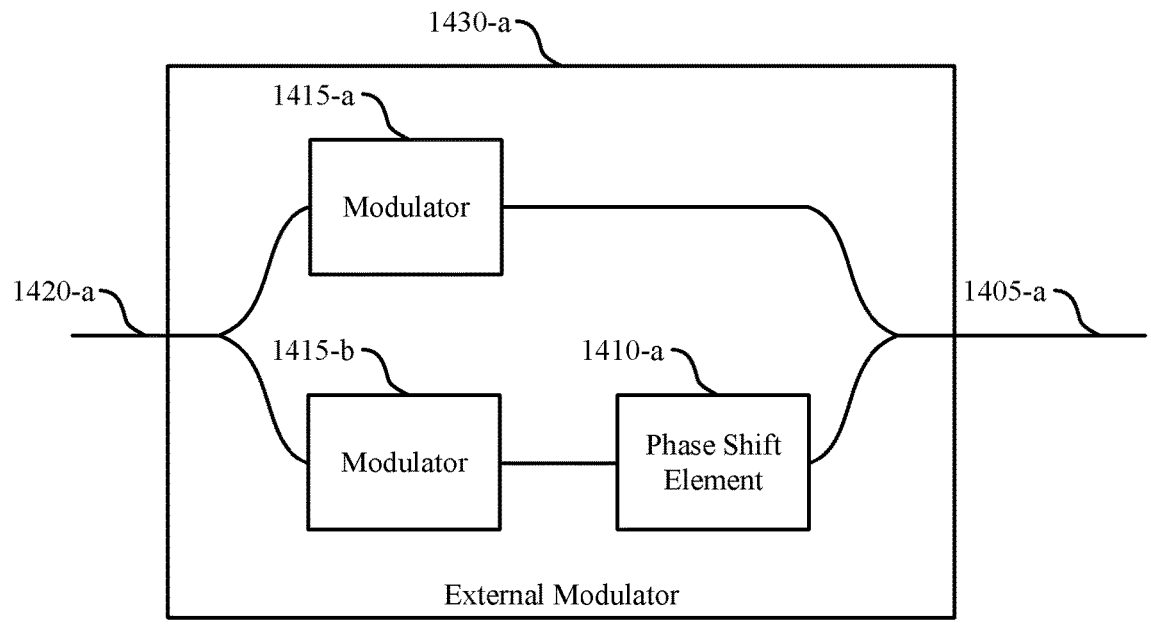
FIGS. 14A-14B are schematic illustrations of fiber communication systems in accordance with aspects of the present disclosure.

FIG. 14A is a schematic illustration of a fiber communications system 1400-*a* that supports network communication systems and methods in accordance with an embodiment of the present disclosure. The fiber communications system 1400-*a* may include one or more components as described with reference to FIGS. 10 through 13. For example, the external modulator 1430-*a* may be an example of external modulators 1330 as discussed with reference to FIG. 13. The external modulator 1430-*a* may include a phase shift element 1410-*a* and modulators 1415-*a* and 1415-*b*.

The external modulator 1430-*a* may be in upstream communication with a laser diode (not illustrated in FIG. 14A). The laser diode may direct a signal to the external modulator 1430-*a*. The signal may be a coherent signal with a frequency corresponding to a seed source. The signal 1405-*a* may be directed to both modulator 1415-*a* and phase shift element 1410-*a*. The phase shift element 1410-*a* may introduce a 90° phase shift to the signal 1405-*a* and output the phase-shifted signal to modulator 1415-*b*. Therefore, the signal directed to modulator 1415-*a* may be 90° out of phase with the signal directed to modulator 1415-*b*. The 90° phase shift of the phase shift element 1410-*a* is used for explanatory purposes only and may be any appropriate phase shift. Modulator 1415-*a* may modulate the signal 1405-*a* to output a first data stream and modulator 1415-*b* may modulate the phase-shifted signal to output a second data stream. The first and second signal streams may be output concurrently as upstream signal 1420-*a*. The upstream communication 1420*a* may include two distinct data streams being communicated according to a wavelength corresponding to the wavelength of a coherent seed source. Therefore, the data streams may not be subject to OBI.

Figure 14B:
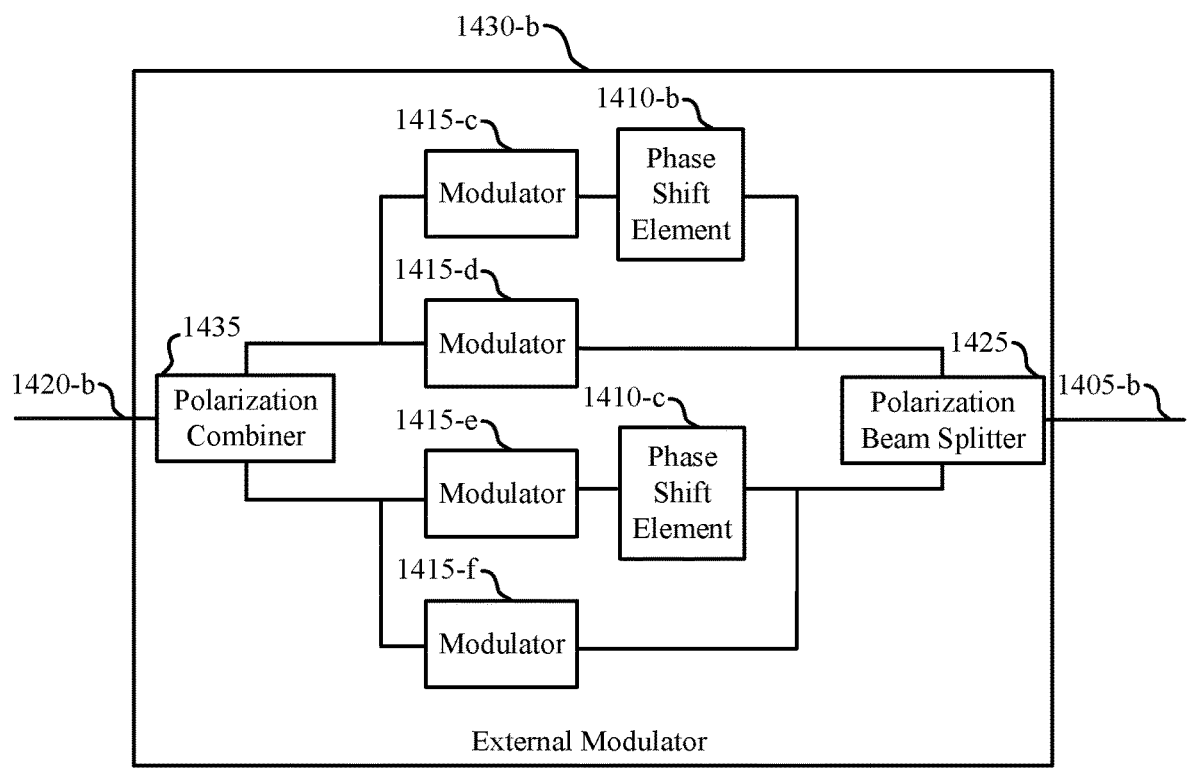

FIG. 14B is a schematic illustration of a fiber communications system 1400-*b* that supports network communication systems and methods in accordance with an embodiment of the present disclosure. The fiber communications system 1400-*b* may include one or more components as described with reference to FIGS. 10 through 13. In some cases, external modulator 1430-*b* may include aspects of external modulator 1430-*a*. For example, phase shift elements 1410-*b* and 1410-*c* and modulators 1415-*c*, 1415-*d*, 1415-*e*, and 1415-*f* may be examples of the corresponding components in external modulator 1430-*a*. The external modulator 1440-*b* may further include polarization beam splitter 1425 and polarization combiner 1435.

The external modulator 1430-*b* may be in communication with a laser diode (not illustrated in FIG. 14B). The laser diode may direct a signal to the external modulator 1430-*b*. The signal may be a coherent signal with a frequency corresponding to a seed source. The external modulator 1430-*b* may utilize phase shift element 1410-*b* and 1410-*c* and polarization beam splitter 1425 to provide four separately modulated signals with unique combinations of polarization and phase shifts, which may be suitable for concurrent upstream communication.

The signal 1405-*b* may be directed to polarization beam splitter 1425. The polarization beam splitter 1425 may split signal 1405-*b* into a first polarization signal and a second polarization signal in which the first and second polarization signals may be different polarizations. For example, polarization beam splitter 1425 may provide a first polarization signal to a phase shift element 1410-*b* and modulator 1415-*d* and provide a second polarization signal to phase shift element 1410-*c* and modulator 1415-*f*. The phase shift elements 1410-*b* and 1410-*c* may introduce a 90° phase shift to the signal collected from the polarization beam splitter 1425. The phase shift element 1410-*b* may output the phase-shifted signal to modulator 1415-*c* and the phase shift element 1410-*c* may output the phase-shifted signal to modulator 1415-*e*.

Thus, between the phase shift elements 1410-*b* and 1410-*c* and the polarization beam splitter 1425, each of the signals collected by the modulators 1415-*c*, 1415-*d*, 1415-*e*, and 1415-*f* may have a unique combination of polarization and phase shift, which may be suitable for concurrent upstream communication. The modulators 1415-*c*, 1415-*d*, 1415-*e*, and 1415-*f* may modulate the collected signals and output a data stream to the polarization combiner 1435. The polarization combiner 1435 may combine each of the data streams and output upstream communication 1420-*b*. The upstream communication 1420-*b* may include four distinct data streams being communicated according to a wavelength corresponding to the wavelength of a coherent seed source. Therefore, the data streams may not be subject to OBI.

Figure 15:
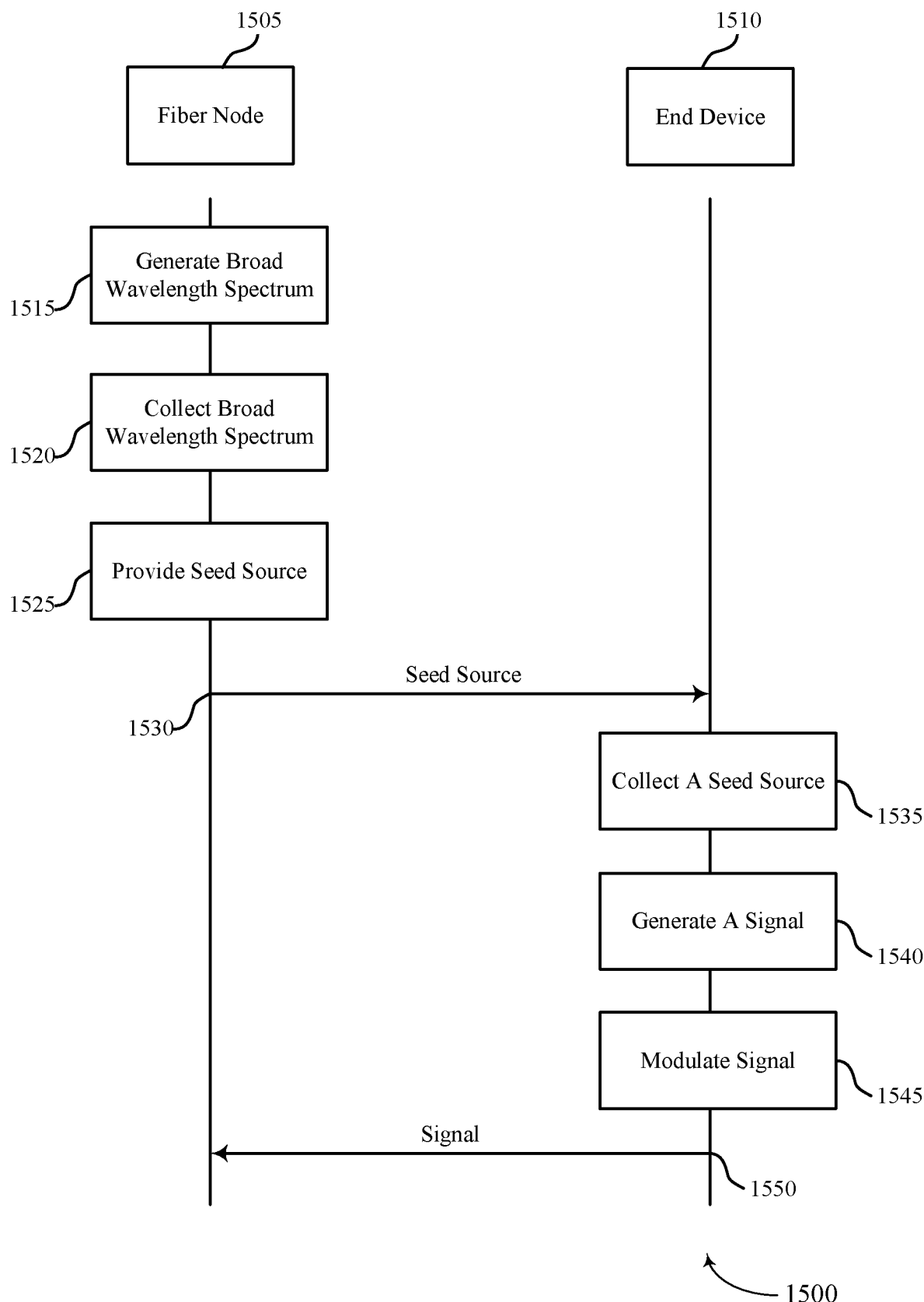
FIG. 15 is a process flow in accordance with aspects of the present disclosure.

FIG. 15 shows a process flow 1500 that supports network communication systems and methods in accordance with aspects of the present disclosure. The process flow 1500 may include operations performed by a fiber node 1505, which may be an example of a fiber node or a component of a fiber node as described with reference to FIGS. 10 through 14. The process flow may further include operations performed by an end device 1510 which may be an example of an end device or a component of an end device as described with reference to FIGS. 10 through 14.

At 1515, the fiber node 1505 may generate, by a light source, a broad wavelength spectrum with a first wavelength range.

At 1520, the fiber node 1505 may collect, at an optical filter, the broad wavelength spectrum with the first wavelength range.

At 1525, the fiber node 1505 may provide, by the optical filter, a seed source from the broad wavelength spectrum. The seed source may include a second wavelength range that is narrower than the first wavelength range. The seed source may to be directed to a laser diode (e.g., at the end device 1510) to stimulate the laser diode to emit an optical signal. In some cases, the fiber node 1505 may provide more than one seed source from the broad wavelength spectrum. For example, the fiber node 1505 may provide, by the optical filter, a second seed source from the first wavelength range, where the second seed source includes a third wavelength range narrower than the first wavelength range and different than the second wavelength range.

At 1530, the fiber node 1505 may output the seed source to the end device 1510.

At 1535, the end device may collect a seed source spanning a wavelength range (e.g., the second wavelength range). In some cases, collecting the seed source may include filtering, at the end device, a combined signal to separately direct a downstream signal and the seed source. The end device may communicate the downstream signal to a photodetector and the seed source to the laser diode.

At 1540, the seed source may generate a signal including primarily the wavelength range (e.g., the second wavelength range) by stimulating a laser diode using the seed source. In some cases, stimulating the laser diode may include injection locking the laser diode using the seed source.

At 1545, the end device may modulate the signal including primarily the wavelength range (e.g., the second wavelength range). The end device may modulate the signal by externally modulating the signal or intensity modulating the signal at the laser diode.

At 1550, the end device may output the modulated signal (e.g., including primarily the second wavelength range). The fiber node 1505 may collect, at an optical splitter, the modulated signal. The modulated signal (e.g., as collected by the optical splitter) may be externally modulated and/or intensity modulated.

Figure 16:
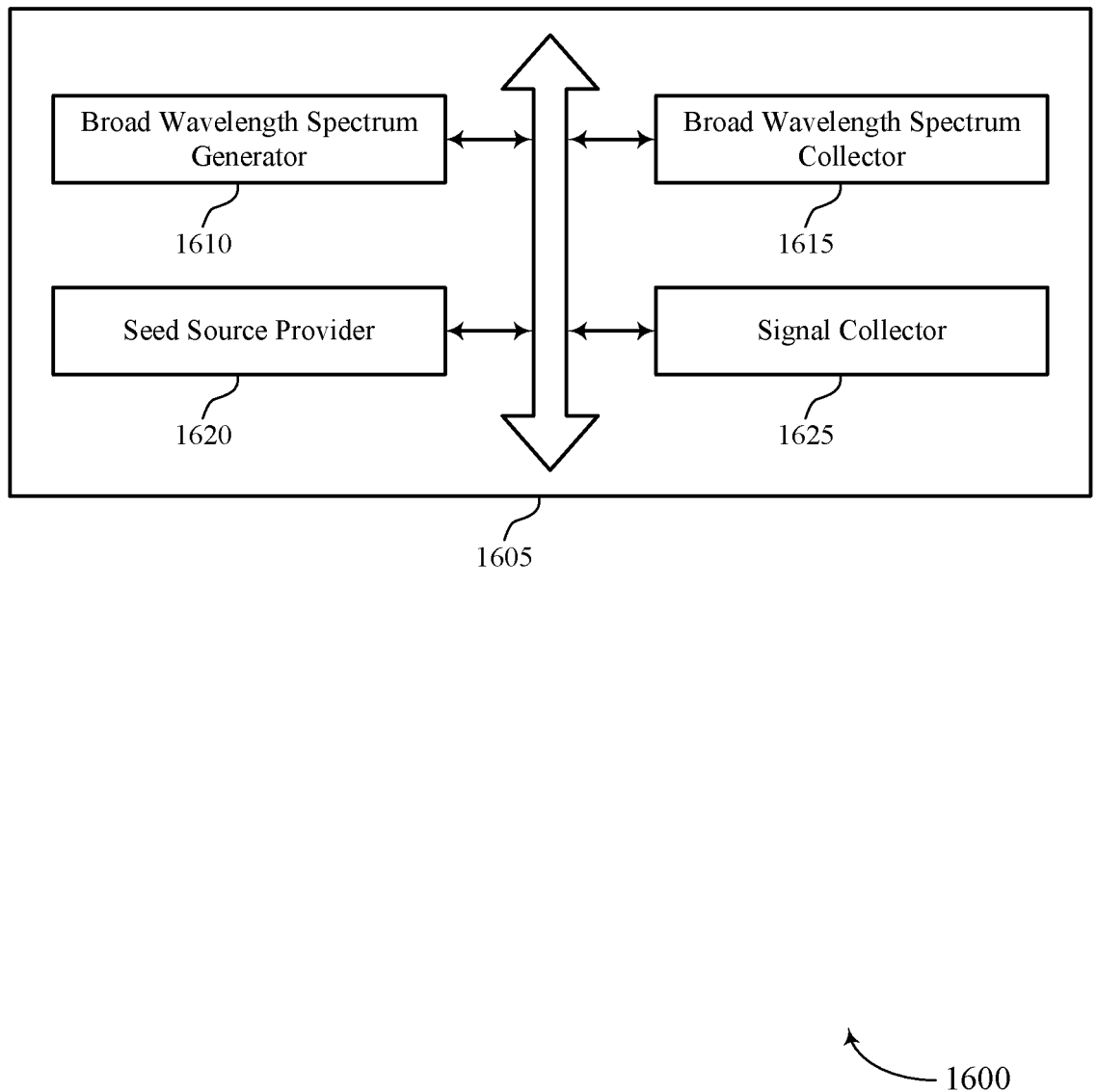
FIG. 16 is a block diagram of a fiber node in accordance with aspects of the present disclosure.

FIG. 16 shows a block diagram 1600 that supports network communication systems and methods of a fiber node 1605 in accordance with aspects of the present disclosure. The device 1605 may be an example of aspects of a fiber node and an optical hub as described with reference to FIGS. 1 through 15. The fiber node 1605 may include a broad wavelength spectrum generator 1610, a broad wavelength spectrum collector 1615, a seed source generator 1620, and a signal collector 1625. Each of these modules may communicate, directly or indirectly, with one another (e.g., via one or more buses, fibers, cables, wires, and so forth).

The broad wavelength spectrum generator 1610 may generate, by a light source, a broad wavelength spectrum with a first wavelength range.

The broad wavelength spectrum collector 1615 may collect, at an optical filter, the broad wavelength spectrum with the first wavelength range.

The seed source provider 1620 may provide, by the optical filter, a seed source from the broad wavelength spectrum, the seed source to be directed to a laser diode to stimulate the laser diode to emit an optical signal, where the seed source includes a second wavelength range narrower than the first wavelength range. In some examples, providing, by the optical filter, a second seed source from the first wavelength range, where the second seed source includes a third wavelength range narrower than the first wavelength range and different than the second wavelength range. In some cases, stimulating the laser diode to emit an optical signal further includes injection locking the laser diode using the seed source.

The signal collector 1625 may collect, at an optical splitter, externally modulated upstream signals, where the externally modulated upstream signals include primarily the second wavelength range. In some examples, the signal collector 1625 may collect, at an optical splitter, intensity modulated upstream signals, where the intensity modulated upstream signals include primarily the second wavelength range.

Figure 17:
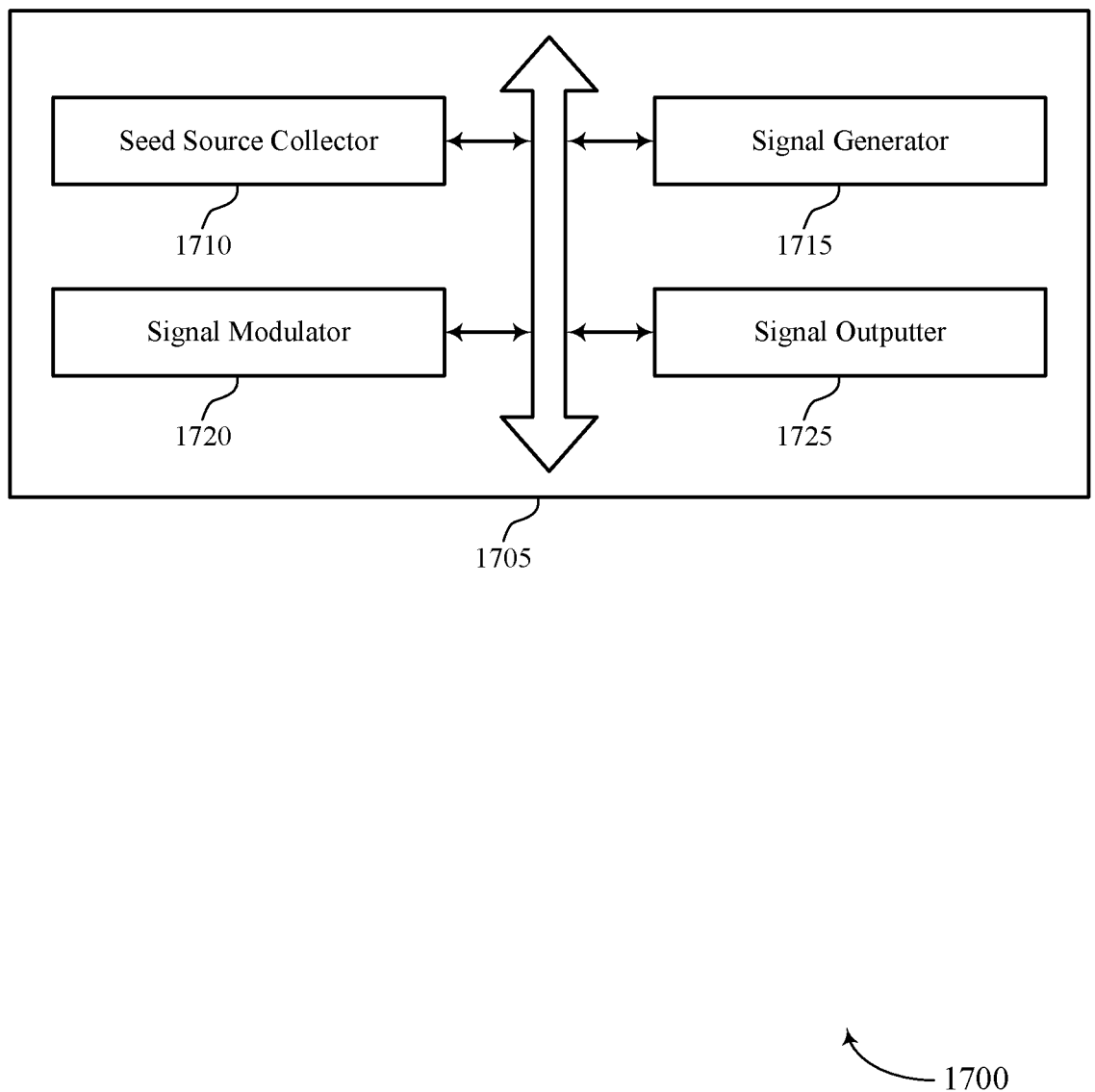
FIG. 17 is a block diagram of an end device in accordance with aspects of the present disclosure.

FIG. 17 shows a block diagram 1700 that supports network communication systems and methods of an end device 1705 in accordance with aspects of the present disclosure. The end device 1705 may be an example of aspects of an end device as described with reference to FIGS. 1 through 9 or an end device as described with reference to FIGS. 10 through 16. The end device 1705 may include a seed source collector 1710, a signal generator 1715, a signal modulator 1720, and a signal outputter 1725. Each of these modules may communicate, directly or indirectly, with one another (e.g., via one or more buses, fibers, cables, wires, and so forth).

The seed source collector 1710 may collect a seed source spanning a wavelength range. The seed source collector 1710 may collect the seed source at an optical splitter. In some examples, the seed source collector 1710 may filter a combined signal to separately direct a downstream signal and the seed source. In some cases, the seed source collector 1710 may communicate the downstream signal to a photodetector and the seed source to the laser diode.

The signal generator 1715 may generate a signal including primarily the wavelength range. The signal generator 1715 may generate the signal based on collecting the seed source (e.g., at the seed source collector 1710). In some cases, the signal generator 1715 may generate the signal by stimulating a laser diode using the seed source. In some examples, generating the signal further includes injection locking the laser diode using the seed source. The signal generator 1715 may drive the laser diode at a constant current.

The signal modulator 1720 may modulate the signal including primarily the wavelength range. In some examples, modulating the signal further includes externally modulating the signal. In some cases, modulating the signal further includes intensity modulating the signal at the laser diode. The signal modulator 1720 may modulate the signal based on one or more data streams.

The signal outputter 1725 may output the modulated signal. The signal outputter 1725 may output the modulated signal by the optical circulator.

Figure 18:
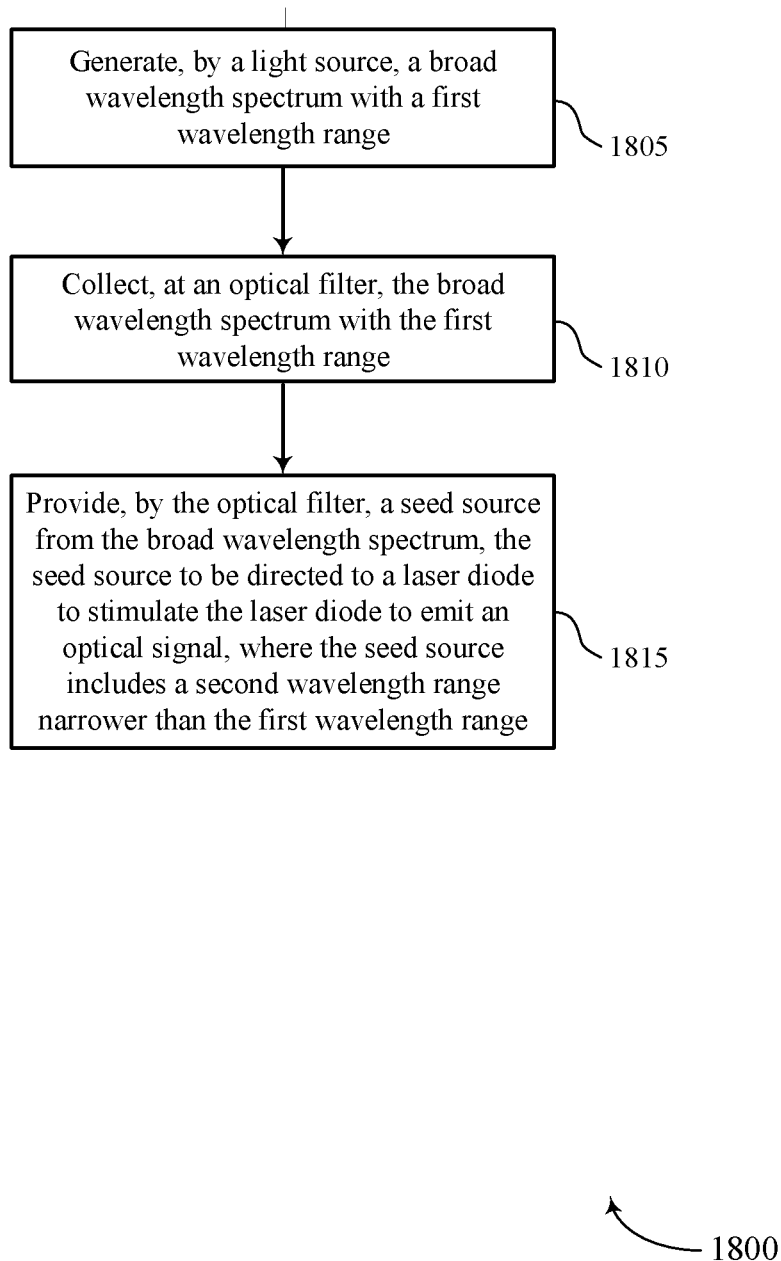
FIGS. 18-22 are flow chart diagrams illustrating a method in accordance with aspects of the present disclosure.

FIG. 18 shows a flow chart illustrating a method 1800 that supports network communication systems in accordance with aspects of the present disclosure. The operations of method 1800 may be implemented by a fiber node or its components as described herein. For example, the operations of method 1800 may be performed by a fiber node as described with reference to FIG. 16. In some examples, a fiber node may execute a set of instructions to control the functional elements of the fiber node and to perform the described functions. Additionally, or alternatively, the fiber node may perform aspects of the described functions using special-purpose hardware.

At 1805, the fiber node may generate, by a light source, a broad wavelength spectrum with a first wavelength range. The operations of 1805 may be performed according to the methods described herein. In some examples, aspects of the operations of 1805 may be performed by a broad wavelength spectrum generator as described with reference to FIG. 16.

At 1810, the fiber node may collect, at an optical filter, the broad wavelength spectrum with the first wavelength range. The operations of 1810 may be performed according to the methods described herein. In some examples, aspects of the operations of 1810 may be performed by a broad wavelength spectrum collector as described with reference to FIG. 16.

At 1815, the fiber node may provide, by the optical filter, a seed source from the broad wavelength spectrum, the seed source to be directed to a laser diode to stimulate the laser diode to emit an optical signal, where the seed source includes a second wavelength range narrower than the first wavelength range. The operations of 1815 may be performed according to the methods described herein. In some examples, aspects of the operations of 1815 may be performed by a seed source provider as described with reference to FIG. 16.

Figure 19:
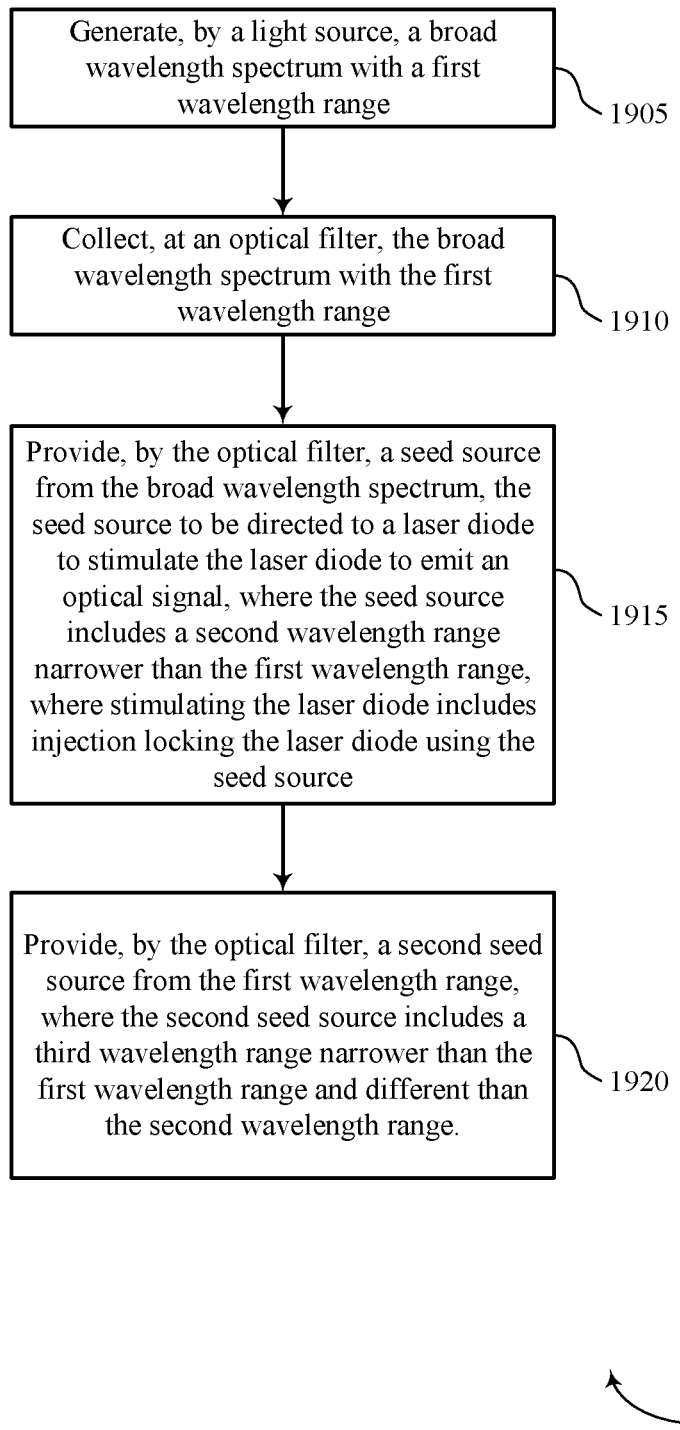

FIG. 19 shows a flow chart illustrating a method 1900 that supports network communication systems in accordance with aspects of the present disclosure. The operations of method 1900 may be implemented by a fiber node or its components as described herein. For example, the operations of method 1900 may be performed by a fiber node as described with reference to FIG. 16. In some examples, a fiber node may execute a set of instructions to control the functional elements of the fiber node to perform the described functions. Additionally, or alternatively, a fiber node may perform aspects of the described functions using special-purpose hardware.

At 1905, the fiber node may generate, by a light source, a broad wavelength spectrum with a first wavelength range. The operations of 1905 may be performed according to the methods described herein. In some examples, aspects of the operations of 1905 may be performed by a broad wavelength spectrum generator as described with reference to FIG. 16.

At 1910, the fiber node may collect, at an optical filter, the broad wavelength spectrum with the first wavelength range. The operations of 1910 may be performed according to the methods described herein. In some examples, aspects of the operations of 1910 may be performed by a broad wavelength spectrum collector as described with reference to FIG. 16.

At 1915, the fiber node may provide, by the optical filter, a seed source from the broad wavelength spectrum, the seed source to be directed to a laser diode to stimulate the laser diode to emit an optical signal, where the seed source includes a second wavelength range narrower than the first wavelength range. In some cases, stimulating the laser diode to emit the optical signal may include injection locking the laser diode using the seed source. The operations of 1915 may be performed according to the methods described herein. In some examples, aspects of the operations of 1915 may be performed by a seed source provider as described with reference to FIG. 16.

At 1920, the fiber node may provide, by the optical filter, a second seed source from the first wavelength range, where the second seed source includes a third wavelength range narrower than the first wavelength range and different than the second wavelength range. The operations of 1920 may be performed according to the methods described herein. In some examples, aspects of the operations of 1920 may be performed by a seed source provider as described with reference to FIG. 16.

Figure 20:
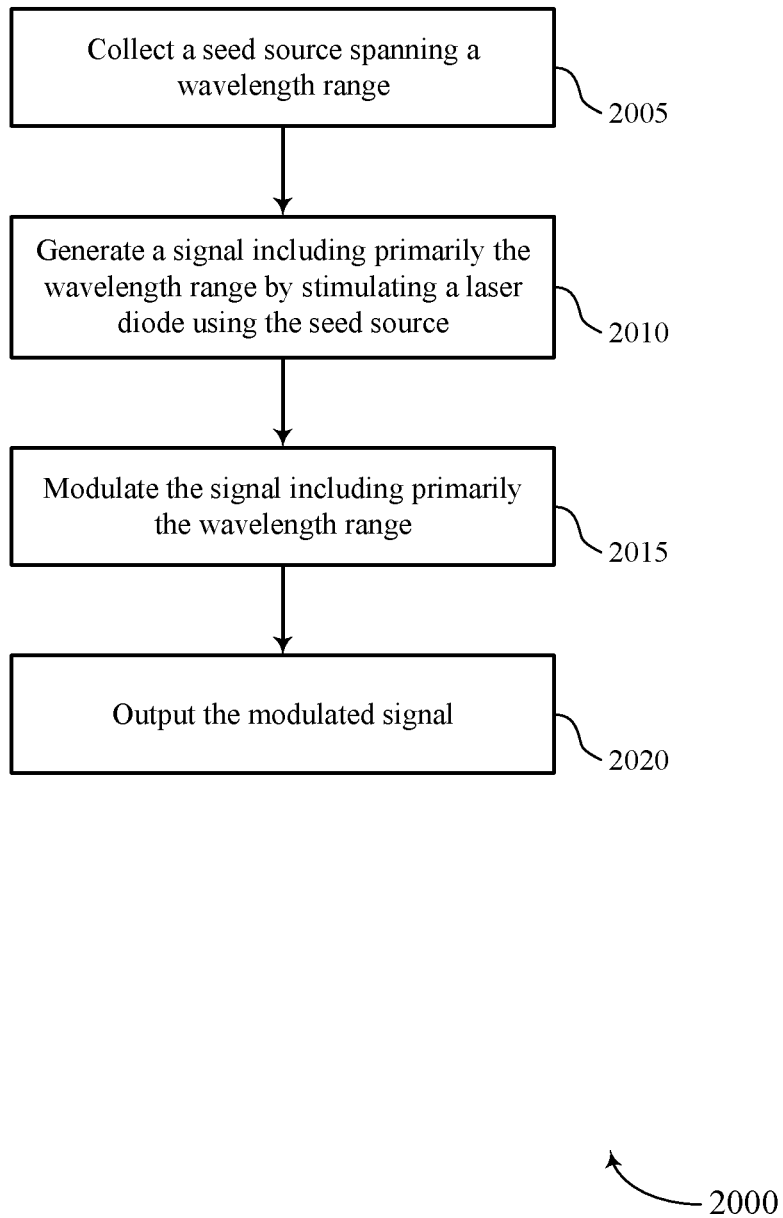

FIG. 20 shows a flow chart illustrating a method 2000 that supports network communication systems in accordance with aspects of the present disclosure. The operations of method 2000 may be implemented by an end device or its components as described herein. For example, the operations of method 2000 may be performed by an end device as described with reference to FIG. 17. In some examples, an end device may execute a set of instructions to control the functional elements of the end device to perform the described functions. Additionally, or alternatively, an end device may perform aspects of the described functions using special-purpose hardware.

At 2005, the end device may collect a seed source spanning a wavelength range. The operations of 2005 may be performed according to the methods described herein. In some examples, aspects of the operations of 2005 may be performed by a seed source collector as described with reference to FIG. 17.

At 2010, the end device may generate a signal including primarily the wavelength range by stimulating a laser diode using the seed source. The operations of 2010 may be performed according to the methods described herein. In some examples, aspects of the operations of 2010 may be performed by a signal generator as described with reference to FIG. 17.

At 2015, the end device may modulate the signal including primarily the wavelength range. The operations of 2015 may be performed according to the methods described herein. In some examples, aspects of the operations of 2015 may be performed by a signal modulator as described with reference to FIG. 17.

At 2020, the end device may output the modulated signal. The operations of 2020 may be performed according to the methods described herein. In some examples, aspects of the operations of 2020 may be performed by a signal outputter as described with reference to FIG. 17.

Figure 21:
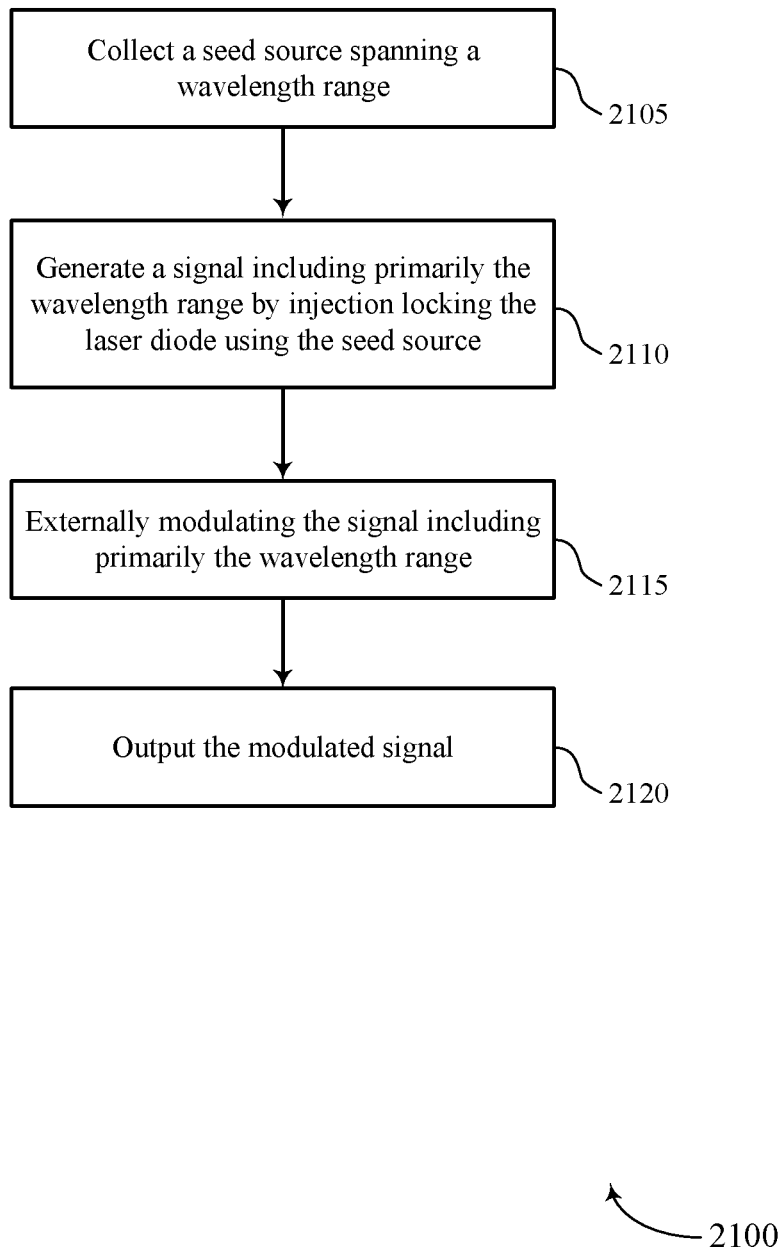

FIG. 21 shows a flow chart illustrating a method 2100 that supports network communication systems in accordance with aspects of the present disclosure. The operations of method or methods 2100 may be implemented by an end device or its components as described herein. For example, the operations of method 2100 may be performed by an end device as described with reference to FIG. 17. In some examples, an end device may execute a set of instructions to control the functional elements of the end device to perform the described functions. Additionally, or alternatively, an end device may perform aspects of the described functions using special-purpose hardware.

At 2105, the end device may collect a seed source spanning a wavelength range. The operations of 2105 may be performed according to the methods described herein. In some examples, aspects of the operations of 2105 may be performed by a seed source collector as described with reference to FIG. 17.

At 2110, the end device may generate a signal including primarily the wavelength range by injection locking a laser diode using the seed source. The operations of 2110 may be performed according to the methods described herein. In some examples, aspects of the operations of 2110 may be performed by a signal generator as described with reference to FIG. 17.

At 2115, the end device may externally modulate the signal including primarily the wavelength range. The operations of 2115 may be performed according to the methods described herein. In some examples, aspects of the operations of 2115 may be performed by a signal modulator as described with reference to FIG. 17.

At 2120, the end device may output the modulated signal. The operations of 2120 may be performed according to the methods described herein. In some examples, aspects of the operations of 2120 may be performed by a signal outputter as described with reference to FIG. 17.

Figure 22:
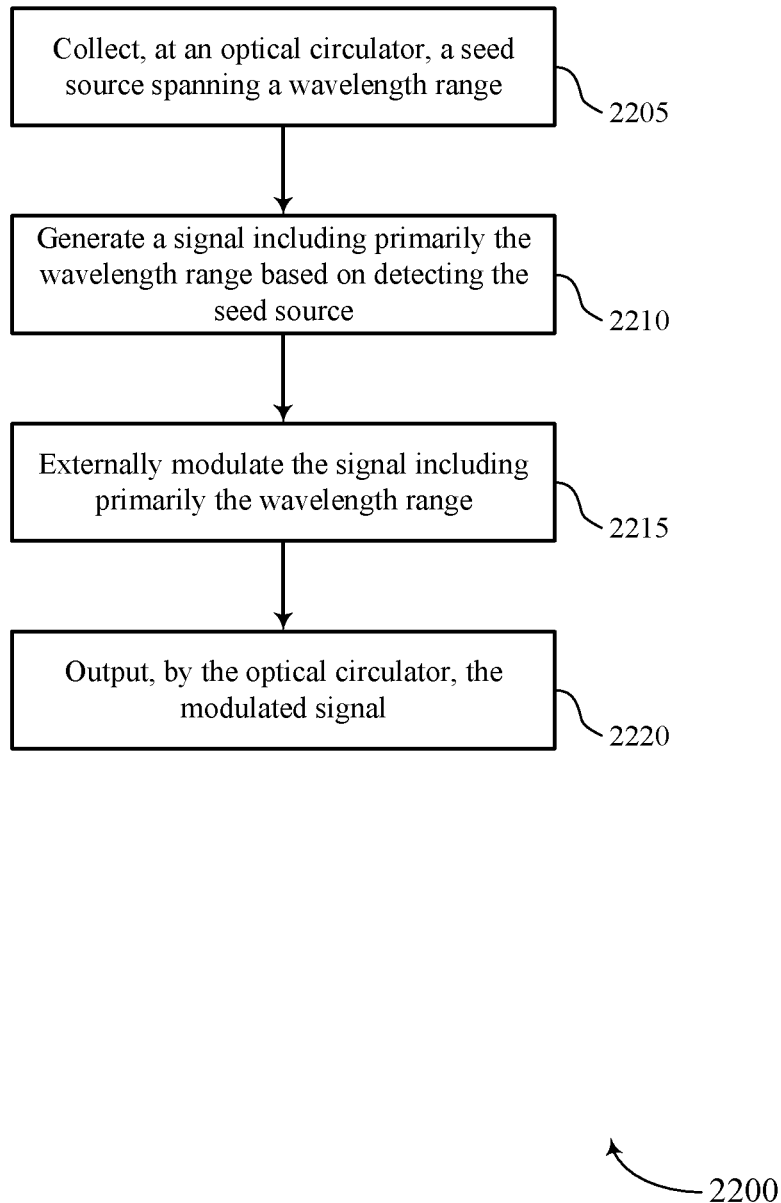

FIG. 22 shows a flow chart illustrating a method 2100 that supports network communication systems in accordance with aspects of the present disclosure. The operations of method or methods 2100 may be implemented by an end device or its components as described herein. For example, the operations of method 2100 may be performed by an end device as described with reference to FIG. 17. In some examples, an end device may execute a set of instructions to control the functional elements of the end device to perform the described functions. Additionally, or alternatively, an end device may perform aspects of the described functions using special-purpose hardware.

At 2105, the end device may collect, at an optical circulator, a seed source spanning a wavelength range. The operations of 2105 may be performed according to the methods described herein. In some examples, aspects of the operations of 2105 may be performed by a seed source collector as described with reference to FIG. 17.

At 2110, the end device may generate a signal including primarily the wavelength range based on collecting the seed source. The operations of 2110 may be performed according to the methods described herein. In some examples, aspects of the operations of 2110 may be performed by a seed source collector as described with reference to FIG. 17.

At 2115, the end device may externally modulate the signal including primarily the wavelength range. The operations of 2115 may be performed according to the methods described herein. In some examples, aspects of the opera-tions of 2115 may be performed by a seed source collector as described with reference to FIG. 17.

At 2120, the end device may output, by the optical circulator, the modulated signal. The operations of 2120 may be performed according to the methods described herein. In some examples, aspects of the operations of 2120 may be performed by a seed source collector as described with reference to FIG. 17.

It should be noted that the methods described herein describe possible implementations, and that the operations and the steps may be rearranged or otherwise modified and that other implementations are possible. Further, aspects from two or more of the methods may be combined.

As illustrated in the embodiments described herein, a difference between upstream and downstream signal transmission is that an entire synchronized modulated/unmodulated channel pair (e.g., second data stream pair 702, FIG. 7) can be transmitted in the downstream direction, whereas, in the upstream direction, only a data modulated signal (e.g., upstream modulated data stream 176 (Ch1')) to be transmitted over the upstream fiber connection, i.e., upstream fiber 110. An advantage of the present configuration is that the LO for upstream coherent collection (e.g., at upstream receiver 132, FIG. 1) comes directly from the split signal, i.e., first unmodulated signal 168 (Ch1) generated from optical frequency comb generator 114 (or multiple quality lasers spaced apart in frequency) within optical hub 102, after separation by first hub optical demultiplexer 124, as depicted in FIG. 1. Conventional systems typically require LO generation at each stage of the respective system. According to the present disclosure, on the other hand, relatively inexpensive slave lasers can be implemented throughout the system architecture for modulation and polarization multiplexing in both optical hub 102 and end device 106 components, without requiring an additional LO source at the end device.

According to the present disclosure, utilization of dual-polarization optical transmitters, and by direct modulation of semiconductor lasers with coherent collection, is particularly beneficial for not only long-haul applications, but also for short-reach applications to reduce the cost of electronic hardware, while also rendering the overall network system architecture more compact. The present systems and methods further solve the conventional problem of synchronizing two laser sources over a long period of time. Utilization of the phase synchronized data stream pairs and slave lasers herein allows continual synchronization of the various laser sources throughout the system during its entire operation. These solutions can be implemented within coherent DWDM-PON system architectures for access networks in a cost-efficient manner.

Utilization of the high quality optical comb source at the front end of the system thus further allows a plurality of simultaneous narrow bandwidth wavelength channels to be generated with easily controlled spacing, and therefore also simplified tuning of the entire wavelength comb. This centralized comb light source in the optical hub provides master seeding sources and LO signals that can be reused throughout the system, and for both downstream and upstream transmission. The implementation of optical injection, as described herein, further improves the performance of low-cost multi-longitudinal slave laser sources in terms of spectral bandwidth and noise properties. Access networks according to the present systems and methods thus achieve more efficient transmission of wavelengths through optical fibers, thereby increasing the capacity of transmitted data, but at lower power, increased sensitivity, lower hardware cost, and a reduction in dispersion, DSP compensation, and error correction.

Embodiments of fiber communication systems and methods are described above in detail. The systems and methods of this disclosure though, are not limited to only the specific embodiments described herein, but rather, the components and/or steps of their implementation may be utilized independently and separately from other components and/or steps described herein. Additionally, the embodiments can be implemented and utilized in connection with other access networks utilizing fiber and coaxial transmission at the end device stage.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. An apparatus for a communications network, comprising:
   a first optical circulator configured to collect, from the communications network, a seed source spanning a wavelength range;
   a laser diode configured to output an output signal comprising primarily the wavelength range collected at the first optical circulator;
   a second optical circulator in communication with the laser diode and configured to collect the output signal from the laser diode; and
   a modulator in operable communication with the first optical circulator and configured to modulate the output signal; and
   a filter configured to collect and separate the seed source and a downstream signal.

2. The apparatus of claim 1, further comprising a first photodetector in communication with the filter.

3. The apparatus of claim 1, wherein the output signal is based at least in part on injection locking the laser diode using the seed source.

4. The apparatus of claim 1, wherein the second optical circulator is disposed between the laser diode and the modulator.

5. The apparatus of claim 4, wherein the second optical circulator is disposed between the modulator and the laser diode.

6. The apparatus of claim 4, wherein the laser diode further comprises a front facet, and wherein the laser diode is further configured to collect the seed source at the front facet.

7. The apparatus of claim 1, wherein the second optical circulator is disposed between the first optical circulator and the laser diode.

8. The apparatus of claim 7, wherein the laser diode further comprises a rear facet, and wherein the laser diode is configured to collect the seed source by the rear facet.

9. The apparatus of claim 8, further comprising a photodetector in one-way communication with the second optical circulator and configured to collect a portion of the seed source reflected from the rear facet of the laser diode to the photodetector, by the second optical circulator.

10. The apparatus of claim 1, wherein the filter is disposed between the first optical circulator and the seed source.

11. The apparatus of claim 1, wherein the filter is disposed between the first optical circulator and the second optical circulator.

12. An apparatus for a communications network, comprising:
   a first optical circulator configured to collect a combined signal comprising a downstream signal and a seed source spanning a wavelength range;
   a filter configured to collect the combined signal from the first optical circulator and separate the downstream signal from the seed source;
   a laser diode configured to collect the seed source from the filter and output an output signal comprising primarily the wavelength range based at least in part on the seed source from the filter;
   a first modulator configured to modulate the output signal; and
   a second optical circulator in communication with the filter and disposed between the laser diode and the first modulator.

13. The apparatus of claim 12, wherein the second optical circulator is (i) in one-way communication with the filter and the first modulator, and (ii) in two-way communication with the laser diode.

14. The apparatus of claim 13, further comprising:
   a second modulator disposed between the first optical circulator and the second optical circulator, wherein the second modulator is configured to (i) collect the output signal from the second optical circulator and (ii) direct a second modulated signal to the first optical circulator; and
   a phase shift element disposed between the first modulator and the second optical circulator.

15. The apparatus of claim 14, further comprising a polarization beam splitter disposed between the second optical circulator and the phase shift element.

16. The apparatus of claim 15, further comprising a polarization combiner disposed between the first optical circulator and the first modulator.

17. The apparatus of claim 16, further comprising:
   a third modulator disposed between the polarization beam splitter and the first optical circulator, wherein the third modulator is configured to input a polarized signal from the polarization beam splitter;
   a fourth modulator; and
   a second phase shift element disposed between the polarization beam splitter and the fourth modulator, wherein the fourth modulator is configured to input the phase shifted signal from the second phase shift element.

18. The apparatus of claim 12, wherein the second optical circulator is in direct communication with the first modulator, the laser diode, and the first optical circulator.

19. The apparatus of claim 12, wherein the first modulator is configured to use coherent modulation such that the modulated signal comprises more than one data stream.

20. The apparatus of claim 19, wherein the first modulator further comprises an in-phase quadrature modulator.

* * * * *